United States Patent
Lee et al.

(10) Patent No.: US 11,432,059 B2
(45) Date of Patent: Aug. 30, 2022

(54) DISPLAY DEVICE AND SOUND PROVIDING METHOD

(71) Applicant: Samsung Display Co., Ltd., Yongin-si (KR)

(72) Inventors: Jae Been Lee, Seoul (KR); Ga Na Kim, Icheon-si (KR); Yi Joon Ahn, Seoul (KR); Jung Hun Noh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 110 days.

(21) Appl. No.: 16/810,754

(22) Filed: Mar. 5, 2020

(65) Prior Publication Data

US 2020/0404403 A1 Dec. 24, 2020

(30) Foreign Application Priority Data

Jun. 19, 2019 (KR) .................. 10-2019-0072596

(51) Int. Cl.
| | |
|---|---|
| *H04R 1/02* | (2006.01) |
| *G06F 1/16* | (2006.01) |
| *H04R 9/06* | (2006.01) |
| *H04R 1/32* | (2006.01) |

(52) U.S. Cl.
CPC .......... *H04R 1/028* (2013.01); *G06F 1/1605* (2013.01); *H04R 1/323* (2013.01); *H04R 9/06* (2013.01); *H04R 2400/03* (2013.01)

(58) Field of Classification Search
CPC .......... H04R 1/028; H04R 1/323; H04R 9/06; H04R 2400/03; G06F 1/1605
See application file for complete search history.

(56) References Cited

U.S. PATENT DOCUMENTS

| | | | | |
|---|---|---|---|---|
| 8,498,441 | B2 * | 7/2013 | Takayama | H04R 3/12 381/388 |
| 8,879,766 | B1 * | 11/2014 | Zhang | H04R 7/045 381/333 |
| 10,009,683 | B2 | 6/2018 | Choi et al. | |
| 2017/0004811 | A1 * | 1/2017 | Yamada | G10H 1/043 |
| 2018/0255391 | A1 * | 9/2018 | Cambrell | H04R 1/26 |
| 2019/0020944 | A1 * | 1/2019 | Kubo | H04R 1/2811 |
| 2019/0037310 | A1 * | 1/2019 | Quan | H04R 3/04 |
| 2019/0191240 | A1 * | 6/2019 | Ham | H04R 1/2834 |
| 2020/0228898 | A1 * | 7/2020 | Starnes | H04R 9/063 |

FOREIGN PATENT DOCUMENTS

| | | | | |
|---|---|---|---|---|
| EP | 2397933 | A2 * | 12/2011 | .......... G06F 3/0436 |
| KR | 10-1684141 | B1 | 12/2016 | |
| KR | 10-1801389 | B1 | 11/2017 | |
| KR | 10-2021-0018703 | | 2/2021 | |

* cited by examiner

*Primary Examiner* — Alexander Krzystan
*Assistant Examiner* — Julie X Dang
(74) *Attorney, Agent, or Firm* — Lewis Roca Rothgerber Christie LLP

(57) ABSTRACT

A display device includes: a display panel; a first sound generator on a first surface of the display panel, the first sound generator being configured to vibrate the display panel to output a first sound; and a second sound generator configured to output a second sound. A third sound is a sum of the first sound and the second sound, and a sound pressure level of at least one of harmonic tones of the third sound is less than a sound pressure level of at least one of harmonic tones of the first sound.

24 Claims, 20 Drawing Sheets

DISPLAY DEVICE AND SOUND PROVIDING METHOD

CROSS-REFERENCE TO RELATED APPLICATION

This application claims priority to and the benefit of Korean Patent Application No. 10-2019-0072596, filed on Jun. 19, 2019 in the Korean Intellectual Property Office (KIPO), the entire content of which is incorporated herein by reference.

BACKGROUND

1. Field

Exemplary embodiments/implementations of the present invention relate generally to a display device and a sound providing method.

2. Description of the Related Art

With the development of information society, requirements for display devices for displaying images have increased in various forms. For example, display devices are applied to various electronic appliances such as smart phones, digital cameras, notebook computers, navigators, and smart televisions. A display device may include a display panel for displaying an image and a sound generator for providing a sound.

The sound output by the sound generator includes a fundamental tone and a harmonic tone. The harmonic tone refers to an overtone having a frequency that is an integer multiple of the frequency of the fundamental tone. The harmonic tone having a frequency that is an even integer multiple of the frequency of the fundamental tone may have the same tone as the fundamental tone, but the harmonic tone having a frequency that is an odd integer multiple of the frequency of the fundamental tone may have a different tone from the fundamental tone. Due to the harmonic tone having a different tone from the fundamental tone, sound quality may be deteriorated.

The above information disclosed in this Background section is only for understanding of the background of the inventive concepts, and, therefore, it may contain information that does not constitute prior art.

SUMMARY

Aspects of devices constructed according to exemplary implementations of the present invention are directed toward a display device, which can prevent or reduce the deterioration of sound quality due to a harmonic tone having a different tone from a fundamental tone.

Aspects of methods constructed according to exemplary implementations of the present invention are directed toward a sound providing method of the display device, which can prevent or reduce the deterioration of sound quality due to a harmonic tone having a different tone from a fundamental tone.

Additional features of the inventive concepts will be set forth in the description which follows, and in part will be apparent from the description, or may be learned by practice of the inventive concepts.

According to one or more embodiments of the invention, a display device includes: a display panel; a first sound generator on a first surface of the display panel, the first sound generator configured to vibrate the display panel to output a first sound; and a second sound generator being configured to output a second sound. A third sound is a sum of the first sound and the second sound, and a sound pressure level of at least one of harmonic tones of the third sound is lower than a sound pressure level of at least one of harmonic tones of the first sound.

A difference between a phase of at least one of the harmonic tones of the first sound and a phase of at least one of harmonic tones of the second sound may be less than $-90°$ and more than $90°$.

The sound pressure level of at least one harmonic tone of the first sound may be different from the sound pressure level of at least one harmonic tone of the second sound.

A sound pressure level of a fundamental tone of the third sound may be greater than a sound pressure level of a fundamental tone of the first sound.

A difference between a phase of the fundamental tone of the first sound and a phase of the fundamental tone of the second sound may be in a range from $-90°$ to $90°$.

The sound pressure level of the fundamental tone of the first sound may be different from the sound pressure level of the fundamental tone of the second sound.

The sound pressure level of a first harmonic tone of the third sound may be less than the sound pressure level of a first harmonic tone of the first sound, and the sound pressure level of a second harmonic tone of the third sound may be less than the sound pressure level of a second harmonic tone of the first sound.

A difference between a phase of the first harmonic tone of the first sound and a phase of the first harmonic tone of the second sound may be less than $-90°$ and more than $90°$, and a difference between a phase of the second harmonic tone of the first sound and a phase of the second harmonic tone of the second sound may be less than $-90°$ and more than $90°$.

The sound pressure level of the first harmonic tone of the first sound may be different from the sound pressure level of the first harmonic tone of the second sound, and the sound pressure level of the second harmonic tone of the first sound may be different from the sound pressure level of the second harmonic tone of the second sound.

The sound pressure level of a first harmonic tone of the third sound may be greater than the sound pressure level of a first harmonic tone of the first sound.

A difference between a phase of the first harmonic tone of the first sound and a phase of the first harmonic tone of the second sound may be in a range from $-90°$ to $90°$.

The sound pressure level of a second harmonic tone of the third sound may be less than the sound pressure level of a second harmonic tone of the first sound.

A difference between a phase of the second harmonic tone of the first sound and a phase of the second harmonic tone of the second sound may be less than $-90°$ and more than $90°$.

Each of the first sound generator and the second sound generator may be a piezoelectric element or a piezoelectric actuator including a piezoelectric material configured to contract and to expand according to an applied voltage.

The second sound generator may be on the first surface of the display panel, and is configured to vibrate the display panel to output the second sound.

The display device may further include: a bracket on the first surface of the display panel. The second sound generator may be on a second surface of the bracket, facing the first surface of the display panel, and configured to vibrate the display panel to output the second sound.

The first sound generator may be a piezoelectric element or a piezoelectric actuator including a piezoelectric material configured to contract and expand according to an applied voltage, and the second sound generator may be a linear resonant actuator configured to vibrate the bracket by generating a magnetic force using a voice coil according to an applied voltage.

The display device may further include: a first sound driver may be configured to convert first sound data into first sound signals and to output the first sound signals to the first sound generator; a second sound driver configured to convert second sound data into second sound signals and to output the second sound signals to the second sound generator; and a phase shifter configured to modulate second sound data and to output the second sound data to the second sound driver to shift a phase of a fundamental tone of the second sound and a phase of at least one harmonic tone of the second sound.

The display device may further include: a main processor configured to output the first sound data to the first sound driver and output the second sound data to the phase shifter; and a main circuit board with the main processor, the second sound driver, and the phase shifter.

The display device may further include: a display circuit board on the first surface of the display panel, the first sound driver being located on the display circuit board.

The phase shifter and the first sound driver may be formed as one integrated circuit.

The display device may further include: a first sound driver configured to convert first sound data into first sound signals and to output the first sound signals to the first sound generator; a second sound driver configured to convert second sound data into second sound signals and to output the second sound signals to the second sound generator; and a look-up table configured to store information about a fundamental tone and at least one harmonic tone of the second sound according to frequencies of a fundamental tone and at least one harmonic tone of the first sound.

The display device may further include: a main processor configured to output the first sound data to the first sound driver and to output the second sound data to a phase shifter; and a main circuit board with the main processor, the second sound driver, and the look-up table.

According to one or more embodiments of the invention, a sound proving method of a display device includes: shifting a phase of a fundamental tone of a first sound in a first sound mode to generate a fundamental tone of a second sound; shifting a phase of at least one harmonic tone of the first sound in the first sound mode to generate at least one harmonic tone of the second sound; outputting first sound data including information about the fundamental tone of the first sound and the at least one harmonic tone of the first sound in the first sound mode, and outputting second sound data including information about the fundamental tone of the second sound and the at least one harmonic tone of the second sound in the first sound mode; generating first sound signals according to the first sound data and outputting the first sound signals to a first sound generator; and generating second sound signals according to the second sound data and outputting the second sound signals to a second sound generator.

The method may further include: shifting a phase of any one harmonic tone of the second sound, having the same frequency as the fundamental tone of the first sound, in a second sound mode; and outputting second sound data including information about the fundamental tone of the second sound and the any one phase-shifted harmonic tone of the second sound in the second sound mode.

The method may further include: shifting a phase of any one harmonic tone of the second sound, having the same frequency as the fundamental tone of the first sound, in a second sound mode; shifting a phase of another harmonic tone of the second sound, having the same frequency as the any one harmonic tone of the first sound, in the second sound mode; and outputting second sound data including information about the fundamental tone of the second sound, the any one phase-shifted harmonic tone of the second sound, and the another harmonic tone of the second sound in the second mode.

A third sound may be a sum of the first sound and the second sound, and a sound pressure level of at least one of harmonic tones of the third sound may be less than a sound pressure level of at least one of harmonic tones of the first sound.

According to aspects of the aforementioned and other exemplary embodiments of the present disclosure, an amplification effect that the sound pressure level of the fundamental tone of the third sound, which is a sum of the first sound and the second sound, becomes higher than the sound pressure level of the fundamental tone of the first sound can be obtained, and concurrently (e.g., simultaneously) an offset effect that the sound pressure level of at least one of the harmonic tones of the third sound becomes lower than (or less than) the sound pressure level of any one of the harmonic tones of the first sound can be obtained. Therefore, it is possible to prevent or reduce the deterioration of sound quality provided to the user due to the harmonic tones of the first sound and to provide a high-quality sound by increasing the sound pressure level of the fundamental tone of the first sound.

Further, an offset effect that the sound pressure levels of the harmonic tones each having a different tone from the fundamental tone of the first sound become low can be obtained, and concurrently (e.g., simultaneously) an amplification effect that the sound pressure levels of the harmonic tones each having the same tone as the fundamental tone of the first sound become high can be obtained. Therefore, it is possible to prevent or reduce the deterioration of sound quality provided to the user due to the harmonic tones each having a different tone from the fundamental tone of the first sound and to provide a high-quality sound by increasing the sound pressure levels of the harmonic tones each having the same tone as the fundamental tone of the first sound.

Other features and exemplary embodiments may be apparent from the following detailed description, the drawings, and the claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
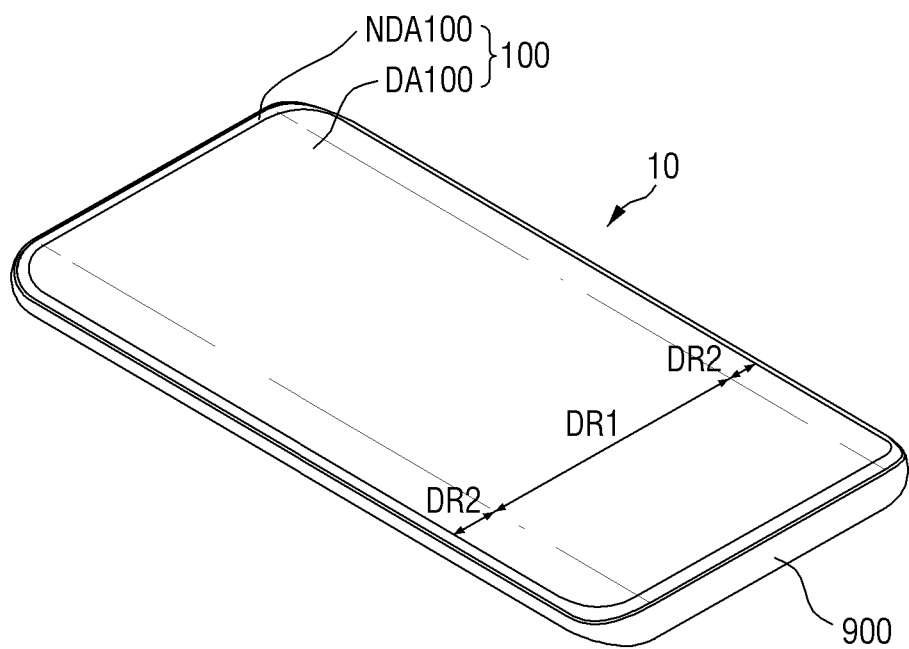
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts. Also, the term "exemplary" is intended to refer to an example or illustration.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. As used herein, the terms "use," "using," and "used" may be considered synonymous with the terms "utilize," "utilizing," and "utilized," respectively. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, acts, operations, elements, components, and/or groups thereof, but do not preclude the presence or addition of one or more other features, integers, steps, acts, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
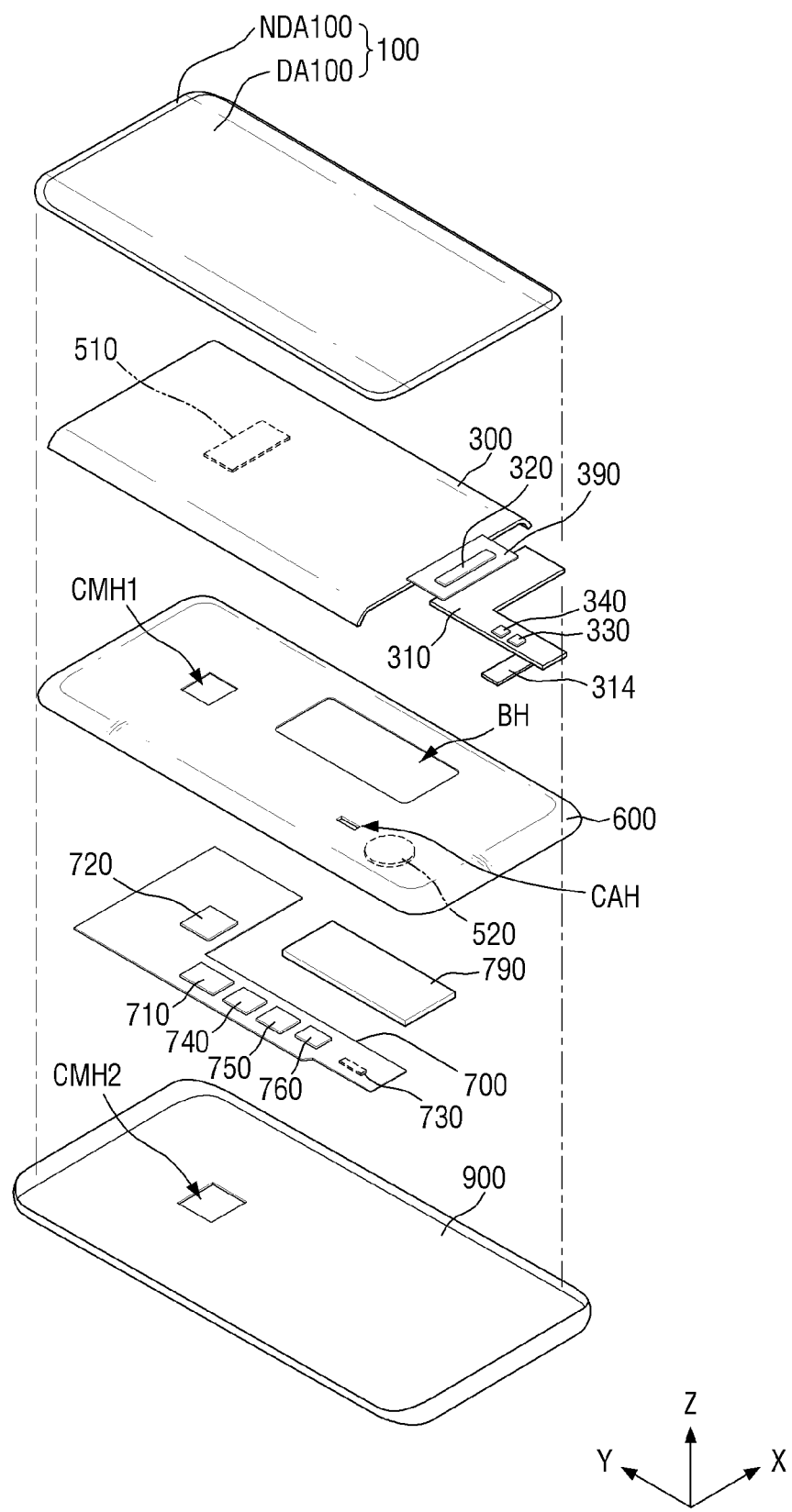
FIG. 2 is an exploded perspective view of a display device according to an exemplary embodiment.

FIG. 1 is a perspective view of a display device according to an exemplary embodiment, and FIG. 2 is an exploded perspective view of a display device according to an exemplary embodiment.

Referring to FIGS. 1 and 2, a display device 10 according to an exemplary embodiment includes a cover window 100, a display panel 300, a display circuit board 310, a display driving circuit 320, a flexible film 390, a first sound generator 510, a second sound generator 520, a bracket 600, a main circuit board 700, and a lower cover 900.

The terms "on", "over", "top", "upper side", or "upper surface" refers to a direction in which the cover window 100 is disposed with respect to the display panel 300 (i.e., a Z-axis direction), and the terms "beneath", "under", "bottom", or "lower surface" refer to a direction in which the bracket 600 is disposed with respect to the display panel 300 (i.e., a direction opposite to the Z-axis direction). Further, the terms "left", "right", "upper", and "lower" refer to directions when the display panel 300 is viewed from a plan view (e.g., in a plane parallel to an X-Y plane of FIGS. 1 and 2). For example, the term "left" refers to a direction opposite to the X-axis direction, the term "right" refers to the X-axis direction, the term "upper" refers to the Y-axis direction, and the "lower" refers to a direction opposite to the Y-axis direction.

The display device 10 may have a rectangular shape in a plan view. For example, as shown in FIGS. 1 and 2, the display device 10 may have a rectangular planar shape having short sides in the first direction (X-axis direction) and long sides in the second direction (Y-axis direction). The edge where the short side in the first direction (X-axis direction) meets the long side in the second direction (Y-axis direction) may be formed to have a round shape of a predetermined or a set curvature or have a right angle shape. The planar shape of the display device 10 is not limited to a rectangular shape, and may be formed in another polygonal shape, circular shape, or elliptical shape.

The display device 10 may include a first area DR1 formed flat and a second area DR2 extending from the right and left sides of the first area DR1. The second area DR2 may be formed to be flat or be curved. When the second area DR2 is flat, the angle formed by the first area DR1 and the second area DR2 may be an obtuse angle. In other words, the boundary of the first area DR1 and the second area DR2 may form an obtuse angle. When the second area DR2 is curved, the second area DR2 may have a constant curvature or a variable curvature.

Although it is shown in FIG. 1 that the second area DR2 extends from the left and right sides of the first area DR1, the present invention is not limited thereto. For example, the second area DR2 may extend from only one of the left and right sides of the first area DR1. In addition, the second area DR2 may extend from only one of the upper and lower sides of the first area DR1 as well as only one of the left and right sides of the first area DR1. Hereinafter, it is assumed that the second area DR2 is disposed along the left and right edges of the display device 10.

The cover window 100 may be disposed on the display panel 300 so as to cover the upper surface of the display panel 300. Thus, the cover window 100 may function to protect the upper surface of the display panel 300.

The cover window 100 may include a light transmitting area DA100 corresponding to the display panel 300 and a light blocking area NDA100 corresponding to an area other than the display panel 300. The cover window 100 may be disposed in the first area DR1 and the second area DR2, and the light transmitting area DA100 may be disposed in a part of the first area DR1 and a part of the second area DR2. The light blocking area NDA100 may be formed to be opaque. In some embodiments, the light blocking area NDA100 may be formed as a decorative layer having a pattern that can be seen to a user when an image is not displayed.

The display panel 300 may be disposed under the cover window 100. The display panel 300 may be disposed to overlap the light transmitting area 100DA of the cover window 100. The display panel 300 may be disposed in the first area DR1 and the second areas DR2. Thus, the image of the display panel 300 may be seen not only in the first area DR1 but also in the second areas DR2.

The display panel 300 may be a light emitting display panel including a light emitting element. Examples of the display panel 300 may include an organic light emitting display panel using an organic light emitting diode including an organic light emitting layer, an ultra-micro light emitting diode display panel using an ultra-micro light emitting diode (ultra-micro LED), a quantum dot light emitting diode display panel using a quantum dot light emitting diode including a quantum dot light emitting layer, and an inorganic light emitting display panel using an inorganic light emitting diode including an inorganic semiconductor. Hereinafter, it is assumed that the display panel 300 is an organic light emitting display panel.

The display circuit board 310 and the display driving circuit 320 may be attached to one side of the display panel 300. One end of the display circuit board 310 may be attached to pads provided at (or on) one side of the display panel 300 using an anisotropic conductive film. The display circuit board 310 may be a flexible printed circuit board, a rigid printed circuit board that is not easily bent, or a composite printed circuit board including both the flexible printed circuit board and the rigid printed circuit board.

The display driving circuit 320 receives control signals and power supply voltages through the display circuit board 310. In some embodiments, the display driving circuit 320 generates and outputs signals and voltages for driving the display panel 300. The display driving circuit 320 may be formed as an integrated circuit and may be attached onto the display panel 300 using a chip on glass (COG) manner, a chip on plastic (COP) manner, or an ultrasonic manner, but the present invention is not limited thereto. For example, the display driving circuit 320 may be attached onto the display circuit board 310. A touch driving circuit 330 and a first sound driver 340 may be disposed on the display circuit board 310.

The touch driving circuit 330 may be formed as an integrated circuit and may be attached to the upper surface of the display circuit board 310. The touch driving circuit 330 may be connected to the touch electrodes of a touch sensor layer of the display panel 300 through the display circuit board 310. The touch driving circuit 330 may apply touch driving signals to driving electrodes from among the touch electrodes, and may sense the charge variations of capacitances between the driving electrodes and the sensing electrodes through the sensing electrodes from among the touch electrodes, thereby outputting touch data including a user's touch coordinates.

The first sound driver 340 receives first sound data from the main circuit board 700. The first sound driver 340 generates first sound signals according to the first sound data, and outputs the first sound signals to the first sound generator 510. The first sound driver 340 may be formed as an integrated circuit.

A power supply unit for supplying display driving voltages for driving the display driving circuit 320 may be disposed on the display circuit board 310. The display driving voltages and the first sound signals may influence each other when they are generated from one circuit. However, the display driving voltages for driving the display panel 300 and the first sound signals for driving the first sound generator 510 may be generated from different circuits from each other. Therefore, it is possible to substantially prevent or prevent the display driving voltages and the first sound signals from influencing each other.

One side of the flexible film 390 may be attached to the upper surface of the display panel 300 in the lower side of the display panel 300 through an anisotropic conductive film. The other side of the flexible film 390 may be attached to the upper surface of the display circuit board 310 in the upper side of the display circuit board 310 through an anisotropic conductive film. The flexible film may be a film that can be bent.

Meanwhile, the flexible film 390 may be omitted, and the display circuit board 310 may be directly attached to one side of the display panel 300. In this case, one side of the display panel 300 may be bent toward the lower surface of the display panel 300.

Figure 3:
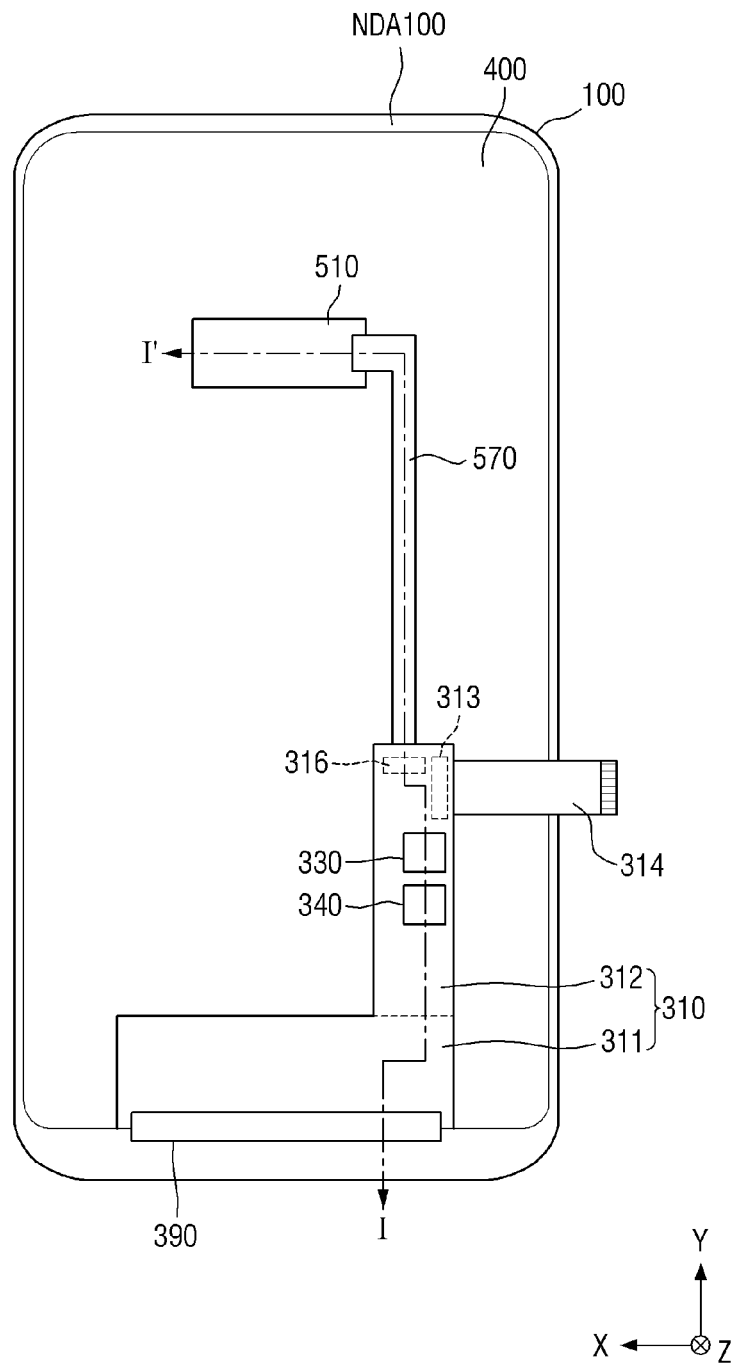
FIG. 3 is a bottom view showing a display panel attached to the cover window of FIG. 2 according to an exemplary embodiment.
Figure 5:
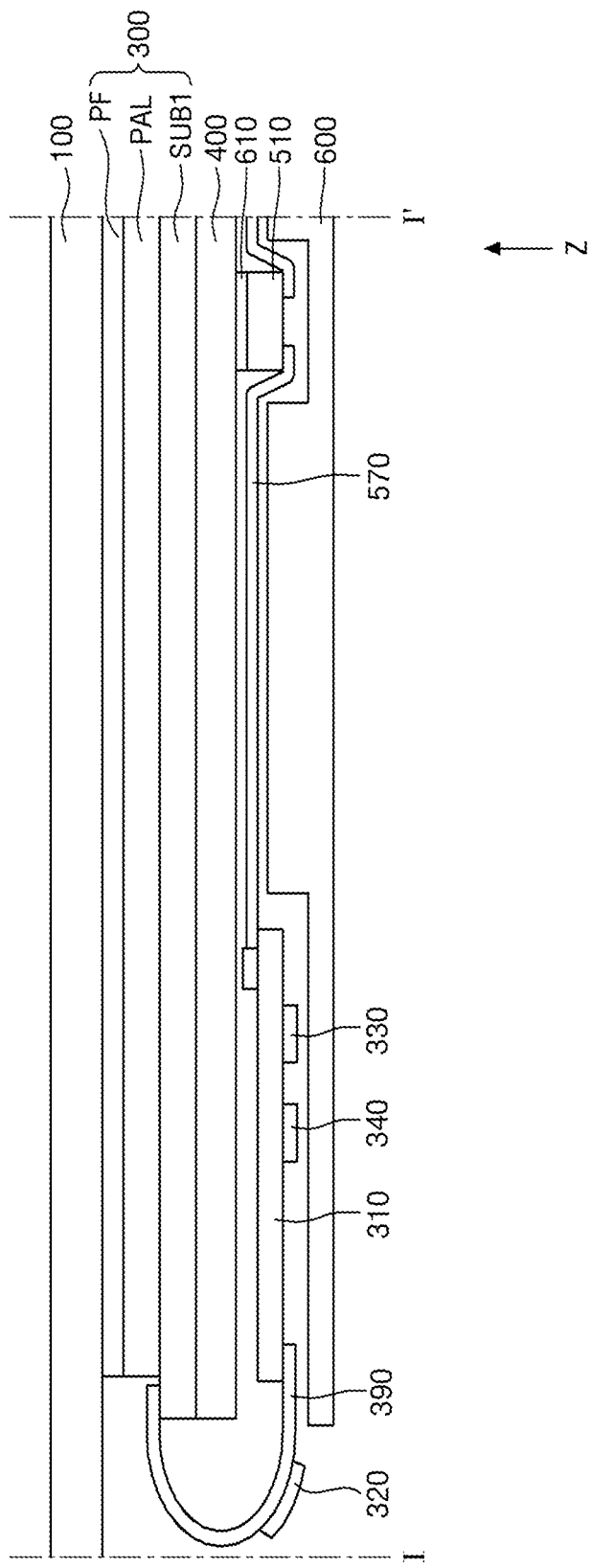
FIG. 5 is a cross-sectional view taken along the line I-I' of FIG. 3 according to an exemplary embodiment.

The first sound generator 510 may be disposed on one side of the display panel 300. As shown in FIG. 5, the first sound generator 510 may be attached on one side of the display panel 300 using a first adhesive member 610 such as a pressure sensitive adhesive. As shown in FIGS. 3 and 5, when a panel lower member 400 is disposed on one surface of the display panel 300, the first sound generator 510 may be attached onto the panel lower member 400 through the first adhesive member 610. The first sound generator 510 may be a piezoelectric element or a piezoelectric actuator that vibrates the display panel 300 using a piezoelectric material contracting and expanding according to an applied voltage. Although it is illustrated in FIG. 2 that the first sound generator 510 has a rectangular parallelepiped shape, the shape of the first sound generator 510 is not limited thereto.

The bracket 600 may be disposed under the display panel 300. The bracket 600 may include plastic, metal, or both plastic and metal. The bracket 600 may be provided with a first camera hole CMH1 into which a camera device 720 is inserted, a battery hole BH in which a battery is disposed, and a cable hole CAH through which a cable 314 connected to the display circuit board 310 passes.

A second sound generator 520 may be disposed on one surface of the bracket 600. The second sound generator 520 may be a linear resonant actuator (LRA) that vibrates the bracket 600 by generating a magnet force using a voice coil based on an applied voltage. Although it is illustrated in FIG. 2 that the second sound generator 520 has a cylindrical shape, the shape of the second sound generator 520 is not limited thereto.

When the first sound generator 510 is a piezoelectric element or a piezoelectric actuator and the second sound generator 520 is a linear resonant actuator (LRA), the first sound generator 510 is suitable for outputting a sound of a relatively higher frequency band than the second sound generator 520, and the second sound generator 520 is suitable for outputting a sound of a relatively lower frequency band than the first sound generator 510.

The main circuit board 700 and a battery 790 may be disposed under the bracket 600. The main circuit board 700 may be a printed circuit board or a flexible printed circuit board.

The main circuit board 700 may include a main processor 710, a camera device 720, a main connector 730, a memory 740, a phase shifter 750, and a second sound driver 760. Each of the main processor 710, the phase shifter 750, and the second sound driver 760 may be formed as an integrated circuit.

The camera device 720 may be disposed on both the upper surface and the lower surface of the main circuit board 700. The main processor 710, the memory 740, the phase shifter 750, and the second sound driver 760 may be disposed on the upper surface of the main circuit board 700, and the main connector 730 may be disposed on the lower surface of the main circuit board 700. The phase shifter 750 may be disposed in the first sound driver 340 without being disposed on the upper surface of the main circuit board 700. That is, the first sound driver 340 and the phase shifter 750 may be constituted by one integrated circuit.

The main processor 710 may control all the functions of the display device 10. For example, the main processor 710 may output digital video data to the display driving unit (e.g., display driving circuit 320) through the display circuit board 310 such that the display panel 300 displays an image. Further, the main processor 710 may receive touch data from the touch driving unit (e.g., touch driving circuit 330), determine the touch position of a user, and then execute an application indicated by an icon displayed at the touch position of the user. Further, the main processor 710 may receive touch data from the touch driving unit 220, and may execute an application indicated by an icon displayed at the touch coordinate of the user according to the touch data.

The main processor 710 receives sound source data from the outside and outputs the sound source data to the memory 740. Because the memory 740 stores sound data according to the frequency of the sound source data, the memory 740 may output the sound data by using the frequency of the sound source data as an input address.

The main processor 710 may control the display device 10 in a first sound mode and a second sound mode. In order to prevent the deterioration of sound quality due to the harmonic tones of a first sound, the main processor 710 may control the display device 10 so as to cancel or partially cancel at least one harmonic tone of the first sound output by the first sound generator 510 using at least one harmonic tone of the second sound output by the second sound generator 520 and to amplify the fundamental tone of the first sound using the fundamental tone of the second sound. The main processor 710 may generate first sound data according to the sound data input from the memory 740 in the first sound mode. The main processor 710 may output the first sound data to the phase shifter 750 in the first sound mode.

In order to provide a sound having both a low frequency band and a high frequency band in the second sound mode, the main processor 710 may control the display device 10 such that the first sound generator 510 outputs a first sound of a high frequency band, and the second sound generator 520 outputs a second sound of a low frequency band. The main processor 710 may generate first sound data and second sound data according to the sound data input from the memory 740 in the second sound mode. The main processor 710 may output the first sound data and the second sound data to the phase shifter in the second sound mode.

The first sound data includes information about the frequency of a fundamental tone of the first sound and the frequencies of harmonic tones of the first sound and information about the sound pressure level or amplitude of a fundamental tone of the first sound and the sound pressure levels or amplitudes of harmonic tones of the first sound. The second sound data includes information about the frequency of a fundamental tone of the second sound and the frequencies of harmonic tones of the second sound and information about the sound pressure level or amplitude of a fundamental tone of the second sound and the sound pressure levels or amplitudes of harmonic tones of the second sound.

The phase shifter 750 receives the first sound data in the first sound mode. The phase shifter 750 modulates the first sound data in the first sound mode and outputs the second sound data. The phase shifter 750 may shift the phase of a fundamental tone of the first sound and the phases of harmonic tones of the first sound data to generate the fundamental tone and harmonic tones of the second sound. The sound pressure levels of the fundamental tone and harmonic tones of the third sound, which is a sum of the first sound and the second sound, may be higher or lower than (i.e., different from) the sound pressure levels of the fundamental tone and harmonic tones of the first sound.

The phase shifter 750 receives the first sound data and the second sound data in the second sound mode. The phase shifter 750 may modulate both the first sound data and the second sound data in the second sound mode, or may modulate any one of the first sound data and the second sound data in the second sound mode. The phase shifter 750 may output the first sound data to the first sound driver 340, and may output the second sound data to the second sound driver 760.

The phase shifter 750 may shift the phase of the harmonic tone of the second sound, having the same frequency as the fundamental tone of the first sound or any one of the harmonic tones of the first tone. Thus, the sound pressure level of the fundamental tone of the third sound or any one of the harmonic tones of the third sound, the third sound being a sum of the first sound and the second sound, may be lower than (or less than) the sound pressure level of the fundamental tone of the first sound or any one of the harmonic tones of the first sound.

As described above, due to the phase shifter 750, an amplification effect may occur that causes the sound pressure level of the fundamental tone of the third sound, which is a sum of the first sound and the second sound, to become higher than (or greater than) the sound pressure level of the fundamental tone of the first sound, and concurrently (e.g., simultaneously) an offset effect may occur that causes the sound pressure level of any one of the harmonic tones of the third sound to become lower than (or less than) the sound pressure level of any one of the harmonic tones of the first sound. Therefore, it is possible to prevent or reduce the deterioration of sound quality provided to the user due to the harmonic tones of the first sound.

The main processor 710 may be an application processor, a central processing unit, or a system chip, which includes an integrated circuit.

The camera device 720 processes an image frame such as a still image or a moving image obtained by an image sensor in a camera mode, and outputs the processed image frame to the main processor 710.

The cable 314 having passed through the cable hole CAH of the bracket 600 may be connected to the main connector 730. Thus, the main circuit board 700 may be electrically connected to the display circuit board 310.

The second sound driver 760 receives the second sound data from the phase shifter 750. The second sound driver 760 generates second sound signals according to the second sound data, and outputs the second sound signals to the second sound generator 520.

In addition, the main circuit board 700 may be further provided with a mobile communication module capable of transmitting and receiving a radio signal to/from at least one of a base station, an external terminal, and a server. The radio signal may include various suitable types of data depending on a voice signal, a video call signal, or a text/multimedia message transmission/reception.

The battery 790 may be disposed not to overlap the main circuit board 700 in the third direction (Z-axis direction). The battery 790 may overlap the battery hole BH of the bracket 600.

The lower cover 900 may be disposed under the main circuit board 700 and the battery 790. The lower cover 900 may be engaged and fixed to the bracket 600. The lower cover 900 may form a lower surface appearance of the display device 10. The lower cover 900 may include plastic and/or metal.

The lower cover 900 may be provided with a second camera hole CMH2 through which the camera device 720 (e.g., a camera device 720 disposed on the lower surface of the main circuit board 700) is exposed. The position of the camera device 720 and the positions of the first and second camera holes CMH1 and CMH2 corresponding to the camera device 720 are not limited to the embodiment shown in FIG. 2.

Figure 4:
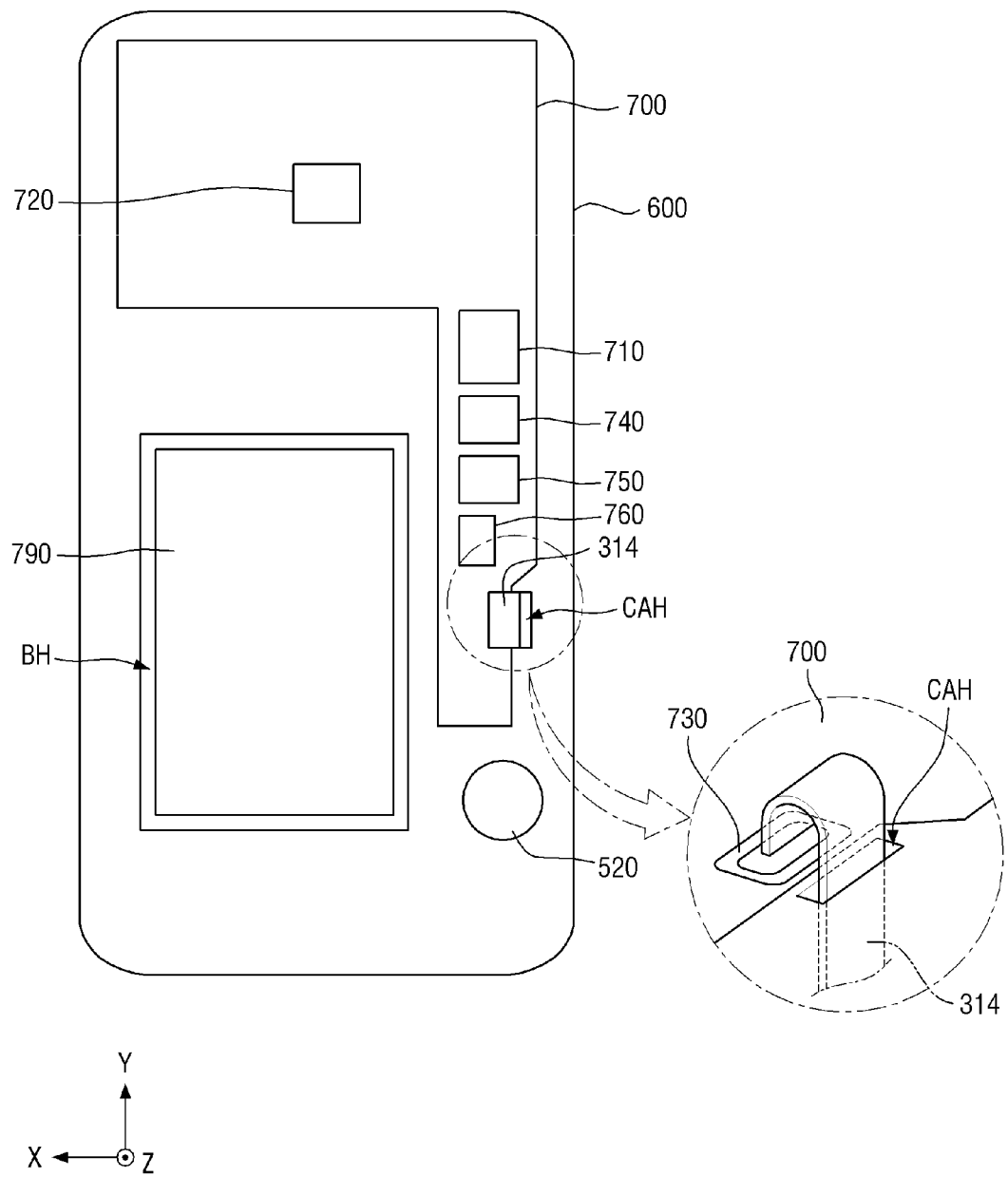
FIG. 4 is a bottom view showing a bracket attached to the lower surface of the display panel of FIG. 3 and a main circuit board disposed on the bracket according to an exemplary embodiment.

FIG. 3 is a bottom view showing a display panel attached to the cover window of FIG. 2 according to an exemplary embodiment, and FIG. 4 is a bottom view showing a bracket 600 attached to the lower surface of the display panel of FIG. 3 and a main circuit board 700 disposed on the bracket 600 according to an exemplary embodiment.

Referring to FIGS. 3 and 4, the panel lower member 400 (e.g., panel lower cover) may be disposed under the display panel 300. The panel lower member 400 (e.g., panel lower cover) may be attached to the lower surface of the display panel 300 through an adhesive member. The adhesive member may be a pressure sensitive adhesive (PSA).

The panel lower member 400 (e.g., panel lower cover) may include at least one of a light absorbing member for absorbing light incident from the outside, a buffer member for absorbing external impact, and a heat radiation member for efficiently radiating heat of the display panel 300.

The light absorbing member may be disposed under the display panel 300. The light absorbing member inhibits the transmission of light to prevent or substantially prevent components disposed under the light absorbing member (e.g., a display circuit board 310, a first sound generator 510, and the like) from being viewed or visible from above the display panel 300. The light absorbing member may include a light absorbing material such as a black pigment or a dye.

The buffer member may be disposed under the light absorbing member. The buffer member absorbs an external impact to substantially prevent or prevent the display panel 300 from being damaged. The buffer member may be formed as a single layer or a plurality of layers. For example, the buffer member may be formed of a polymer resin such as polyurethane, polycarbonate, polypropylene, and/or polyethylene, or may be formed of an elastic material such as a rubber, a urethane material, and/or a sponge formed by foaming an acrylic material. The buffer member may be a cushion layer.

The heat radiation member may be disposed under the buffer member. The heat radiation member may include a first heat radiation layer including graphite or carbon nanotubes and a second heat radiation layer capable of blocking electromagnetic waves and formed of a metal thin film of copper, nickel, ferrite and/or silver having excellent thermal conductivity.

Meanwhile, the panel lower member 400 may be omitted. In this case, the components disposed on the lower surface of the panel lower member 400 (e.g., the display circuit board 310, the first sound generator 510, and the like) may be disposed on the lower surface of the display panel 300 instead of the lower surface of the panel lower member 400.

The flexible film 390 attached to one side of the display panel 300 may be bent (FIG. 3 shows the flexible film 390 already bent according to an exemplary embodiment), and may be disposed under the panel lower member 400. Therefore, the display circuit board 310 attached to one side of the flexible film 390 may be disposed under the panel lower member 400. The display circuit board 310 may be fixed or attached to the lower surface of the panel lower member 400 by a fixing member such as a screw or an adhesive member such as a pressure sensitive adhesive under the panel lower member 400.

The display circuit board 310 may include a first circuit board 311 and a second circuit board 312. Each of the first circuit board 311 and the second circuit board 312 may be a rigid printed circuit board or a flexible printed circuit board. When any one of the first circuit board 311 and the second circuit board 312 is a rigid printed circuit board and the other one thereof is a flexible printed circuit board, the display circuit board 310 may be a composite printed circuit board.

It is illustrated in FIG. 3 that the second circuit board 312 extends from one side of the first circuit board 311 in the second direction (Y-axis direction). The width of the second circuit board 312 in the first direction (X-axis direction) may be smaller than the width of the first circuit board 311 in the first direction (X-axis direction).

The touch driving circuit 330 and the first sound driver 340 may be disposed on one surface of the second circuit board 312, and a first connector 313 and a second connector 316 may be disposed on the other surface (e.g., the opposite surface) of the second circuit board 312. The first connector 313 may include an insertion portion connected to a first connection terminal provided at one end of the cable 314. The second connector 316 may include an insertion portion connected to a connection terminal provided at one end of a first flexible circuit board 570.

The first connection terminal provided at one end of the cable 314 may be inserted into the insertion portion of the first connector 313. The second connection terminal provided at the other end of the cable 314 may be bent toward the lower portion of the main circuit board 700 through the cable hole CAH penetrating the bracket 600 and inserted into the insertion portion of the main connector 730.

The first sound generator 510 may be disposed on the lower surface of the panel lower member 400. The first sound generator 510 may be attached to the lower surface of the panel lower member 400 by a first adhesive member 610 such as a pressure sensitive adhesive. Thus, the display panel 300 may be vibrated by the first sound generator 510 in the thickness direction (Z-axis direction).

The connection terminal provided at one end of the first flexible circuit board 570 may be inserted into the insertion portion of the second connector 316. The other end of the first flexible circuit board 570 may be connected to the first sound generator 510. The first flexible circuit board 570 may be a flexible printed circuit (FPC).

The bracket 600 may include a battery hole BH, a cable hole CAH, and a first camera hole CMH1. The battery hole BH, the cable hole CAH, and the first camera hole CMH1 may be holes penetrating the bracket 600.

Because the battery hole BH is a hole for accommodating a battery, the battery 790 may overlap the battery hole BH along the third direction (Z-axis direction) as shown in FIG. 5. The size of the battery hole BH may be larger than the size of the battery 790 as shown in FIG. 5.

Because the first camera hole CMH1 of the bracket 600 is a hole for accommodating the camera device 720 of the main circuit board 700, the camera device 720 may overlap the first camera hole CMH1 along the third direction (Z-axis direction).

According to the embodiment shown in FIGS. 3-5, the first sound generator 510 may be electrically connected to the display circuit board 310 through the first flexible circuit board 570. The main circuit board 700 and the display circuit board 310 may be electrically connected to each other through the cable 314.

FIG. 5 is a cross-sectional view taken along the line I-I' of FIG. 3 according to an exemplary embodiment.

Referring to FIG. 5, the display panel 300 may include a substrate SUB1, a pixel array layer PAL, and a polarizing film PF.

The substrate SUB1 may be a rigid substrate or a flexible substrate capable of bending, folding, rolling, or the like. The substrate SUB1 may be made of an insulating material such as glass, quartz, or a polymer resin. Examples of the polymer resin may include polyethersulphone (PES), polyacrylate (PA), polyarylate (PAR), polyetherimide (PEI), polyethylenenapthalate (PEN), polyethylene terepthalate (PET), polyphenylenesulfide (PPS), polyallylate, polyimide (PI), polycarbonate (PC), cellulosetriacetate (CAT), cellulose acetate propionate (CAP), and combinations thereof. The substrate SUB1 may include a metal material.

Figure 6:
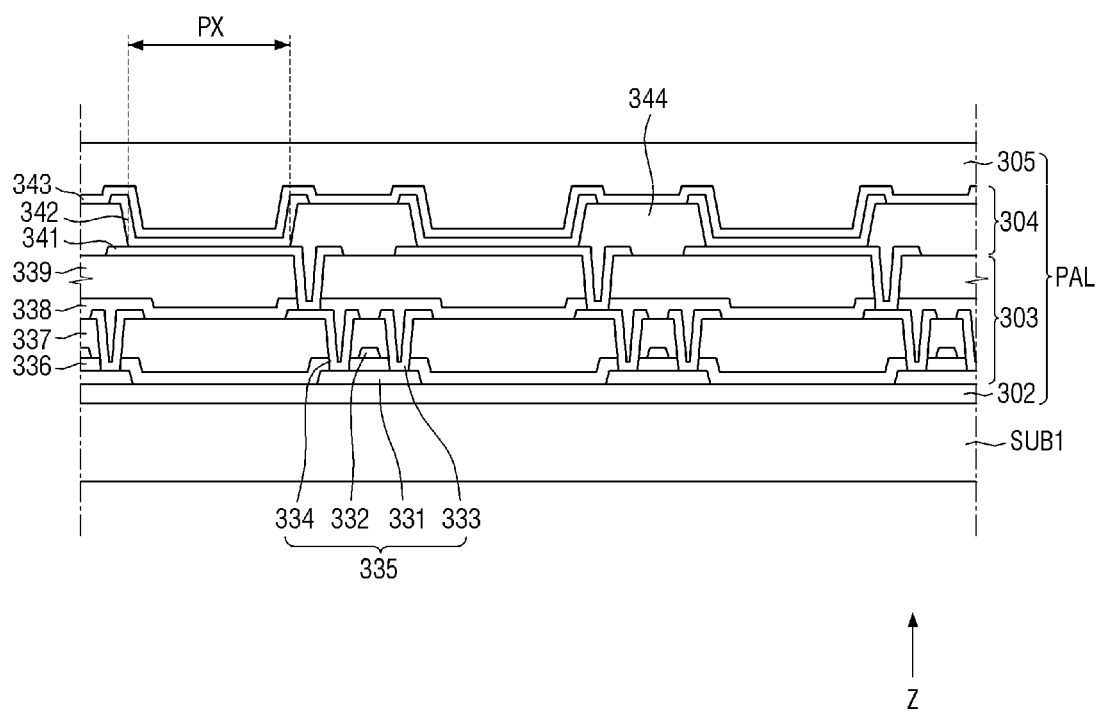
FIG. 6 is a cross-sectional view specifically showing the display area of the display panel of FIG. 5 according to an exemplary embodiment.

The pixel array layer PAL may be disposed on the substrate SUB1. The pixel array layer PAL may be a layer including pixels PX to display an image. The pixel array layer PAL may include a thin film transistor layer 303, a light emitting element layer 304, and a thin film encapsulation layer 305 as shown in FIG. 6.

In order to prevent or reduce the deterioration of visibility due to external light reflection, the polarizing film PF may be disposed on the pixel array layer PAL. The polarizing film PF may include a linear polarizer and a phase retardation film such as a quarter-wave plate. For example, the phase retardation film may be disposed on the pixel array layer PAL, and the linear polarizer may be disposed between the phase retardation film and the cover window 100.

The panel lower member 400 may be disposed on the first surface of the display panel 300, and the cover window 100 may be disposed on the second surface of the display panel 300, the second surface thereof being opposite to the first surface thereof. That is, the panel lower member 400 may be disposed on the lower surface of the substrate SUB1 of the display panel 300, and the cover window 100 may be disposed on the upper surface of the polarizing film PF.

One side of the flexible film 390 may be attached to one side of the substrate SUB1, and the other side of the flexible film 390 may be attached to one side of the display circuit board 310. One side of the flexible film 390 may be attached to one surface of the substrate SUB1 using an anisotropic conductive film. The other side of the flexible film 390 may be attached to one surface of the display circuit board 310 using an anisotropic conductive film. The other surface of the display circuit board 310, which is opposite to one surface thereof, may face the panel lower member 400.

Although it is illustrated in FIG. 5 that the display driving circuit 320 is disposed on one surface of the flexible film 390, the present invention is not limited thereto. The display drive circuit 320 may be disposed on the other surface of the flexible film 390, which is opposite to the one surface thereof.

The display circuit board 310 may be disposed on the lower surface of the panel lower member 400. The display circuit board 310 may be fixed to the lower surface of the panel lower member 400 by a fixing member such as a screw or an adhesive member.

The touch driving circuit 330 and the first sound driver 340 may be disposed on one surface of the display circuit board 310. The first connector 313 and the second connector 316 may be disposed on the other surface of the display circuit board 310.

The first sound generator 510 may be disposed between the panel lower member 400 and the bracket 600. The first surface of the first sound generator 510 may be attached to the panel lower member 400 by the first adhesive member 610. Because the first sound generator 510 may be fixed to the panel lower member 400, the display panel 300 may be vibrated by the vibration of the first sound generator 510. That is, the first sound generator 510 may output the first sound by vibrating the display panel 300. The first adhesive member 610 may be a pressure sensitive adhesive. The first flexible circuit board 570 may be attached onto the second surface of the first sound generator 510.

When the first sound generator 510 is disposed on the heat radiation member of the panel lower member 400, the first heat radiation layer of the heat radiation member may be broken by the vibration of the first sound generator 510. Therefore, in the area where the first sound generator 510 is disposed, the heat radiation member may be removed, and the first sound generator 510 may be attached to the lower surface of the buffer member. Alternatively, in the area where the first sound generator 510 is disposed, the buffer member and the heat radiation member may be removed, and the first sound generator 510 may be attached to the lower surface of the light absorbing member.

The first flexible circuit board 570 (e.g., a first flexible printed circuit board) may be attached to the second surface of the first sound generator 510 using an anisotropic conductive film. The lead lines of the first flexible circuit board 570 may be connected to the first and second electrodes of the first sound generator 510, respectively. The connection terminal provided at one end of the first flexible circuit board 570 may be connected to the lead lines. The connection terminal of the first flexible circuit board 570 may be inserted into the insertion portion of the second connector 316. The first flexible circuit board 570 may be a flexible printed circuit (FPC) or a flexible film.

FIG. 6 is a cross-sectional view specifically showing the display area of the display panel of FIG. 5 according to an exemplary embodiment.

Referring to FIG. 6, the display panel 300 may include a substrate SUB1 and a pixel array layer PAL. The pixel array layer PAL may include a thin film transistor layer 303, a light emitting element layer 304, and a thin film encapsulation layer 305 as shown in FIG. 6.

A buffer film 302 may be formed on the substrate SUB1. The buffer film 302 may be formed on the substrate SUB1 so as to protect thin film transistors 335 and light emitting elements from moisture penetrating through the substrate SUB1 which is vulnerable to moisture. The buffer film 302 may be formed of a plurality of alternately laminated inorganic films. For example, the buffer film 302 may be formed as a multi-layer film in which one or more inorganic layers including one or more of a silicon oxide (SiOx), a silicon nitride (SiNx), and SiON are alternately stacked. In some embodiments, the buffer film 302 may be omitted.

The thin film transistor layer 303 is disposed on the buffer film 302. The thin film transistor layer 303 includes thin film transistors 335, a gate insulating film 336, an interlayer insulating film 337, a protective film 338, and a planarization film 339.

Each of the thin film transistors 335 includes an active layer 331, a gate electrode 332, a source electrode 333, and a drain electrode 334. Although it is shown in FIG. 6 that the thin film transistors 335 are formed by a top gate manner in which the gate electrode 332 is located on the active layer 331, it should be noted that the present invention is not limited thereto. That is, the thin film transistors 335 may be formed by a bottom gate manner in which the gate electrode 332 is located beneath the active layer 331, or may be formed by a double gate manner in which the gate electrode 332 is located both on and beneath the active layer 331.

The active layer 331 is formed on the buffer film 302. The active layer 331 may be formed of a silicon-based semiconductor material or an oxide-based semiconductor material. A light blocking layer for blocking external light incident on the active layer 331 may be formed between the buffer film 302 and the active layer 331.

The gate insulating film 336 may be formed on the active layer 331. The gate insulating film 336 may be formed of an inorganic film (e.g., a silicon oxide (SiOx) film, a silicon nitride (SiNx) film, or a multi-layer film thereof).

The gate electrode 332 and a gate line may be formed on the gate insulating film 336. The gate electrode 332 and the gate line may be formed of a single layer or a multi-layer including at least one of molybdenum (Mo), aluminum (Al), chromium (Cr), gold (Au), titanium (Ti), nickel (Ni), neodymium (Nd) and copper (Cu), or an alloy thereof.

The interlayer insulating film 337 may be formed on the gate electrode 332 and the gate line. The interlayer insulating film 337 may be formed of an inorganic film (e.g., a silicon oxide (SiOx) film, a silicon nitride (SiNx) film, or a multi-layer film thereof).

The source electrode 333, the drain electrode 334, and a data line may be formed on the interlayer insulating film. Each of the source electrode 333 and the drain electrode 334 may be connected to the active layer 331 through a contact hole penetrating the gate insulating film 336 and the interlayer insulating film 337. The source electrode 333, the drain electrode 334, and the data line may be formed of a single layer or a multi-layer including at least one of molybdenum (Mo), aluminum (Al), chromium (Cr), gold (Au), titanium (Ti), nickel (Ni), neodymium (Nd) and copper (Cu), and/or an alloy thereof.

The protective film 338 for insulating the thin film transistor 335 may be formed on the source electrode 333, the drain electrode 334, and the data line. The protective film 338 may be formed of an inorganic film (e.g., a silicon oxide (SiOx) film, a silicon nitride (SiNx) film, or a multi-layer film thereof).

The planarization film 339 for flattening a step due to the thin film transistor 335 may be formed on the protective film 338. The planarization film 339 may be formed of an organic film including an acryl resin, an epoxy resin, a phenolic resin, a polyamide resin, and/or a polyimide resin.

The light emitting element layer 304 is formed on the thin film transistor layer 303. The light emitting element layer 304 includes light emitting elements and a pixel defining film 344.

The light emitting elements and the pixel defining film 344 are formed on the planarization film 339. The light emitting element may be an organic light emitting element including an anode electrode 341, a light emitting layer 342, and a cathode electrode 343.

The anode electrode 341 may be formed on the planarization film 339. The anode electrode 341 may be connected to the source electrode 333 of the thin film transistor 335 through a contact hole penetrating the protective film 338 and the planarization film 339.

The pixel defining film 344 may be formed on the planarization film 339 to cover the edge of the anode electrode 341 so as to define pixels. That is, the pixel defining film 344 serves to define pixels. Each of the pixels refers to an area where the anode electrode 341, the light emitting layer 342, and the cathode electrode 343 are sequentially laminated, and holes from the anode electrode 341 and electrons from the cathode electrode 343 are combined with each other in the light emitting layer 342 to emit light.

The light emitting layers 342 are formed on the anode electrode 341 and the pixel defining film 344. The light emitting layers 342 are organic light emitting layers. The light emitting layer 342 may emit one of red light, green light, and blue light. The light emitting layer 342 may be a white light emitting layer that emits white light. In this case, the light emitting layer 342 may have a laminate structure of a red light emitting layer, a green light emitting layer, and a blue light emitting layer, and may be a common layer formed commonly in the pixels. In this case, the display panel 300 may further include separate color filters for displaying red, green, and blue colors.

The light emitting layer 342 may include a hole transporting layer, a light emitting layer, and an electron transporting layer. Further, the light emitting layer 342 may be formed to have a tandem structure of two stacks or more, and in this case, a charge generating layer may be formed between the stacks.

The cathode electrode 343 is formed on the light emitting layer 342. The cathode electrode 343 may be formed to cover the light emitting layer 342. The cathode electrode 343 may be a common layer formed commonly in the pixels.

When the light emitting element layer 304 is formed according to a top emission manner in which light is emitted upward, the anode electrode 341 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. The APC alloy may be an alloy of silver (Ag), palladium (Pd), and copper alloy (Cu). The cathode electrode 343 may be formed of a transparent conductive material (TCO) such as ITO or IZO, which is light-transmissive, or a semi-transmissive conductive material such as magnesium (Mg), silver (Ag), or an alloy of magnesium (Mg) and silver (Ag). When the cathode electrode 343 is formed of a semi-transmissive conductive material, light emission efficiency may be increased by microcavities.

When the light emitting element layer 304 is formed by a bottom emission manner in which light is emitted downward, the anode electrode 341 may be formed of a transparent conductive material (TCO) such as ITO or IZO, or a semi-transmissive conductive material such as magnesium (Mg), silver (Ag), or an alloy of magnesium (Mg) and silver (Ag). The cathode electrode 343 may be formed of a high-reflectance metal material such as a laminate structure (Ti/Al/Ti) of aluminum and titanium, a laminate structure (ITO/Al/ITO) of aluminum and TIO, an APC alloy, or a laminate structure (ITO/APC/ITO) of an APC alloy and ITO. When the anode electrode 341 is formed of a semi-transmissive conductive material, light emission efficiency may be increased by microcavities.

The thin film encapsulation layer 305 is formed on the light emitting element layer 304. The thin film encapsulation layer 305 serves to prevent or reduce oxygen or moisture from permeating the light emitting layer 342 and the cathode electrode 343. For this purpose, the thin film encapsulation layer 305 may include at least one inorganic film. The inorganic film may be formed of silicon nitride, aluminum nitride, zirconium nitride, titanium nitride, hafnium nitride, tantalum nitride, silicon oxide, aluminum oxide, and/or titanium oxide. The thin film encapsulation layer 305 may further include at least one organic film. The organic film may be formed to have a sufficient thickness to substantially prevent or prevent foreign matter (particles) from penetrating the thin film encapsulation layer 305 and entering the light emitting layer 342 and the cathode electrode 343. The organic film may include any one of epoxy, acrylate, and urethane acrylate.

A touch sensor layer may be formed on the thin film encapsulation layer 305. When the touch sensor layer is formed directly on the thin film encapsulation layer 305, there is an advantage that the thickness of the display device 10 may be reduced, compared to when a separate touch panel is attached onto the thin film encapsulation layer 305.

The touch sensor layer may include touch electrodes for sensing a touch of a user in a capacitance manner, and touch lines for connecting the pads and the touch electrodes. For example, the touch sensor layer may sense a user's touch by a self-capacitance manner or a mutual capacitance manner.

Figure 7:
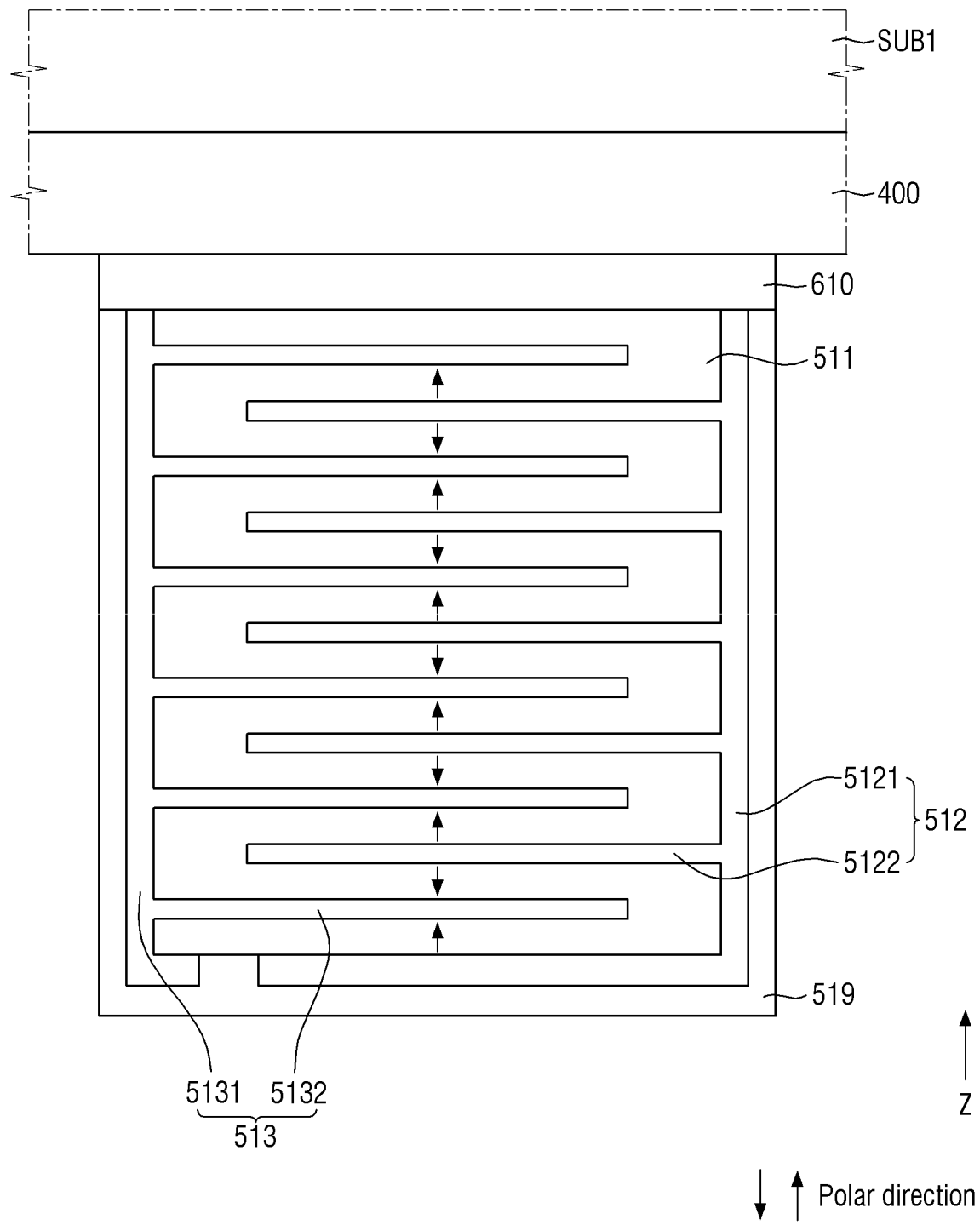
FIG. 7 is a cross-sectional view specifically showing the first sound generator of FIG. 5 according to an exemplary embodiment.
Figure 8:
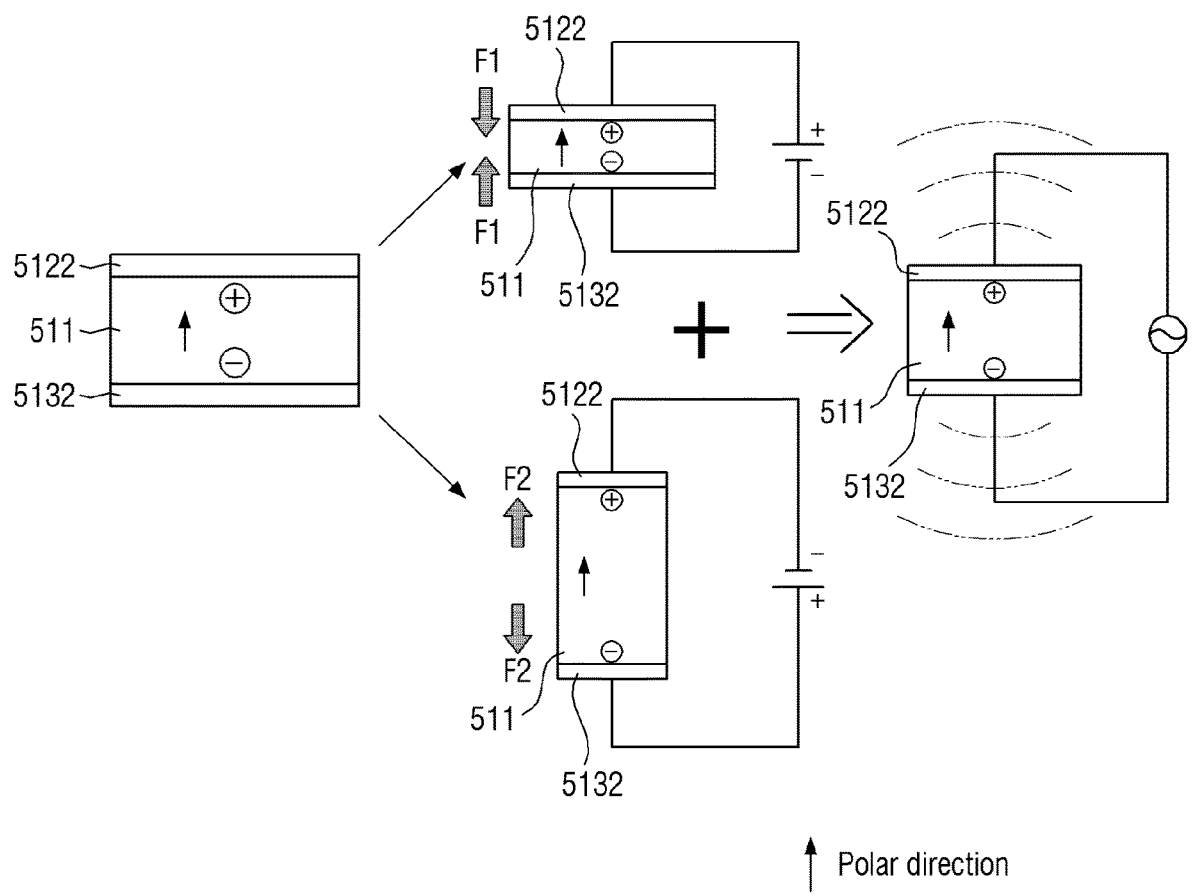
FIG. 8 is a view showing a method of vibrating a vibration layer disposed between the first branch electrode and second branch electrode of the first sound generator of FIG. 7 according to an exemplary embodiment.

FIG. 7 is a cross-sectional view specifically showing the first sound generator of FIG. 5 according to an exemplary embodiment, and FIG. 8 is a view showing a method of vibrating a vibration layer disposed between the first branch electrode and second branch electrode of the first sound generator of FIG. 7 according to an exemplary embodiment.

Referring to FIGS. 7 and 8, the first sound generator 510 may be a piezoelectric element or a piezoelectric actuator for vibrating the display panel 300 using a piezoelectric material contracting or expanding depending on the applied voltage. The first sound generator 510 may include a vibration layer 511, a first electrode 512, and a second electrode 513.

The first electrode 512 may include a first stem electrode 5121 and first branch electrodes 5122. The first stem electrode 5121 may be disposed on at least one side surface of the vibration layer 511 as shown in FIG. 7. Alternatively, the first stem electrode 5121 may be disposed to penetrate a part of the vibration layer 511. The first stem electrode 5121 may be disposed on the upper surface of the vibration layer 511. The first branch electrodes 5122 may be branched from the first stem electrode 5121. The first branch electrodes 5122 may be arranged in parallel to each other.

The second electrode 513 may include a second stem electrode 5131 and second branch electrodes 5132. The second electrode 513 may be spaced apart from the first electrode 512. Thus, the second electrode 513 may be electrically separated from the first electrode 512. The second stem electrode 5131 may be disposed on at least one side surface of the vibration layer 511. In this case, the first stem electrode 5121 may be disposed on the first side surface of the vibration layer 511, and the second stem electrode 5131 may be disposed on the second side surface of the vibration layer 511. Alternatively, the second stem electrode 5131 may be disposed to penetrate a part of the vibration layer 511. The second stem electrode 5131 may be disposed on the upper surface of the vibration layer 511. The second branch electrodes 5132 may be branched from the second stem electrode 5131. The second branch electrodes 5132 may be arranged in parallel to each other.

The first branch electrodes 5122 and the second branch electrodes 5132 may be arranged in parallel to each other in the horizontal direction (X-axis direction or Y-axis direction). Further, the first branch electrodes 5122 and the second branch electrodes 5132 may be alternately arranged in the vertical direction (Z-axis direction). That is, the first branch electrodes 5122 and the second branch electrodes 5132 may be arranged repeatedly in the vertical direction (Z-axis direction) in order of the first branch electrode 5122, the second branch electrode 5132, the first branch electrode 5122, and the second branch electrode 5132.

The first electrode 512 and the second electrode 513 may be connected to the pads of the first flexible circuit board 570. The pads of the first flexible circuit board 570 may be connected to the first electrode 512 and second electrode 513 exposed onto one surface of the first sound generator 510.

The vibration layer 511 may be a piezoelectric element that is deformed in accordance with a driving voltage applied to the first electrode 512 and a driving voltage applied to the second electrode 513. In this case, the vibration layer 511 may be made of any one of a piezoelectric material such as poly vinylidene fluoride (PVDF) or plumbum zirconate titanate (PZT), and an electroactive polymer.

Because the vibration layer 511 is formed at high temperature, the first electrode 512 and the second electrode 513 may be formed of silver (Ag) or an alloy of silver (Ag) and palladium (Pd), each having a high melting point. When the first electrode 512 and the second electrode 513 are formed of an alloy of silver (Ag) and palladium (Pd) to increase the melting points of the first electrode 512 and the second electrode 513, the content of silver (Ag) may be higher than the content of palladium (Pd).

The vibration layer 511 may be disposed between the first branch electrodes 5122 and the second branch electrodes 5132. The vibration layer 511 contracts or expands according to the difference between a driving voltage applied to the first branch electrodes 5122 and a driving voltage applied to the second branch electrodes 5132.

As shown in FIG. 8, the polar direction of the vibration layer 511 disposed between the first branch electrode 5122 and the second branch electrode 5132 disposed under the first branch electrode 5122 may be an upward direction (i), the vibration layer 511 has a positive polarity in the upper region adjacent to the first branch electrode 5122, and has a negative polarity in the lower region adjacent to the second branch electrode 5132. Further, the polar direction of the vibration layer 511 disposed between the second branch electrode 5132 and the first branch electrode 5122 disposed under the second branch electrode 5132 may be a downward direction (i), the vibration layer 511 has negative polarity in the upper region adjacent to the second branch electrode 5132, and has positive polarity in the lower region adjacent to the first branch electrode 5122. The polar direction of the vibration layer 511 may be determined by a poling process of applying an electric field to the vibration layer 511 using the first branch electrode 5122 and the second branch electrode 5132.

As shown in FIG. 8, in the case where the polar direction of the vibration layer 511 disposed between the first branch electrode 5122 and the second branch electrode 5132 disposed under the first branch electrode 5122 is the upward direction (i), when a driving voltage having positive polarity is applied to the first branch electrode 5122, and a driving voltage having negative polarity is applied to the second branch electrode 5132, the vibration layer 511 may be contracted by a first force F1. The first force F1 may be a contraction force. Further, when a driving voltage having negative polarity is applied to the first branch electrode 5122, and a driving voltage having positive polarity is applied to the second branch electrode 5132, the vibration layer 511 may be expanded by a second force F2. The second force F2 may be an extension force.

Similarly to FIG. 8, in the case where the polar direction of the vibration layer 511 disposed between the second branch electrode 5132 and the first branch electrode 5122 disposed under the second branch electrode 5132 is the downward direction (↓), when a driving voltage having positive polarity is applied to the second branch electrode 5132, and a driving voltage having negative polarity is applied to the first branch electrode 5122, the vibration layer 511 may be expanded by the extension force. The first force F1 may be a contraction force. Further, when a driving voltage having negative polarity is applied to the second branch electrode 5132, and a driving voltage having positive polarity is applied to the first branch electrode 5122, the vibration layer 511 may be contracted by the contraction force.

When the driving voltage applied to the first electrode 512 and the driving voltage applied to the second electrode 513 are alternately repeated in positive and negative polarities, the vibration layer 511 repeats contraction and expansion. Thus, the first sound generator 510 vibrates. Because the first sound generator 510 is disposed on one surface of the heat radiation film 130, the display panel 300 is vibrated in the third direction (Z-axis direction), which is the thickness direction of the display panel 300, by the stress, when the vibration layer 511 of the first sound generator 510 contracts and expands. Therefore, the display panel 300 may be vibrated by the first sound generator 510, thereby outputting the first sound.

A protective layer 519 may be additionally provided on the second surface and side surfaces of the first sound generator 510. The protective layer 519 may be formed of an insulating material, or may be formed of the same material as the vibration layer 511. The protective layer 519 may be disposed on the first electrode 512, the second electrode 513, and the vibration layer 511 exposed by the first electrode 512 and the second electrode 513 without being covered by the first electrode 512 and the second electrode 513. The protective layer 519 may be disposed to surround the first electrode 512, the second electrode 513, and the vibration layer 511 exposed by the first electrode 512 and the second electrode 513 without being covered by the first electrode 512 and the second electrode 513. Therefore, the vibration layer 511, the first electrode 512 and the second electrode 513 of the first sound generator 510 may be protected by the protection layer 519. In some embodiments, the protective layer 519 may be omitted.

Figure 9:
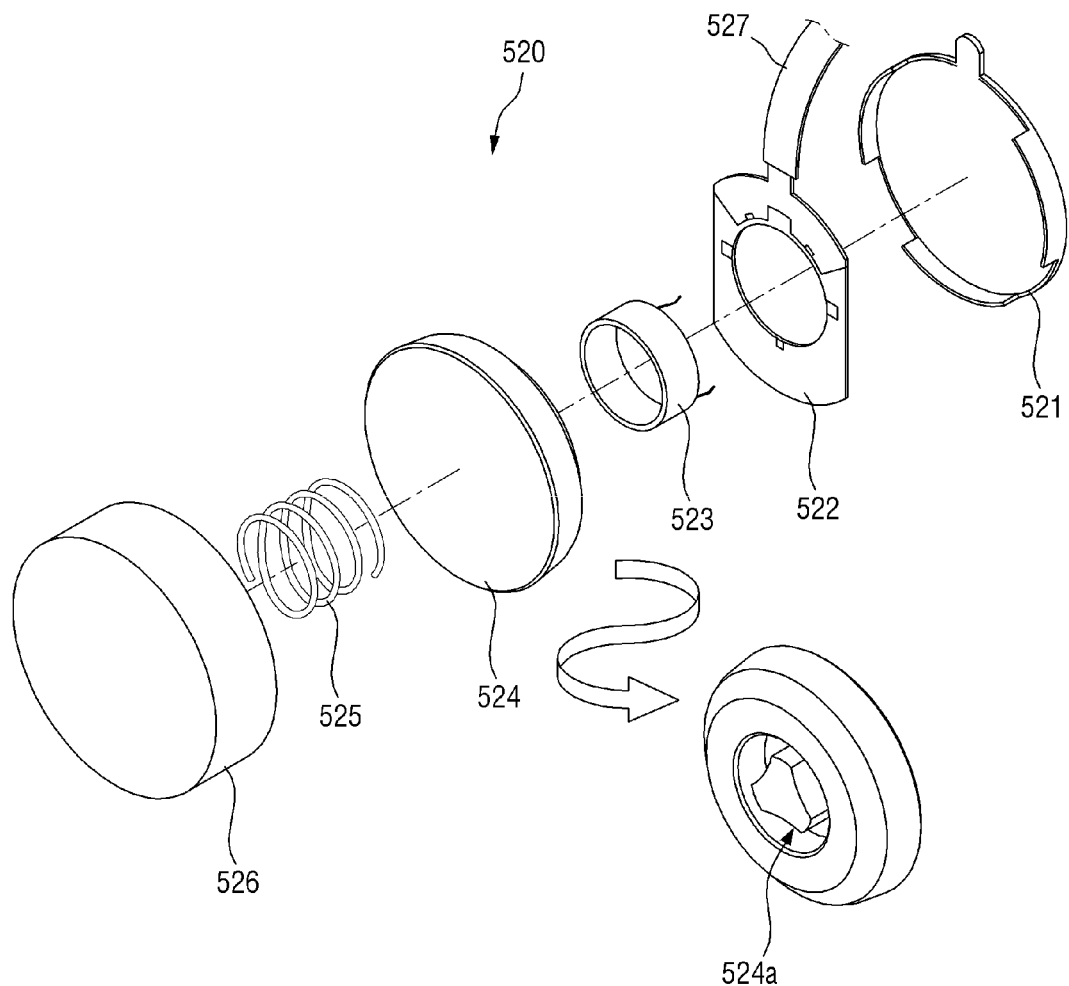
FIG. 9 is a perspective view specifically showing the second sound generator of FIG. 5 according to an exemplary embodiment.

FIG. 9 is a perspective view specifically showing the second sound generator of FIG. 5 according to an exemplary embodiment.

Referring to FIG. 9, the second sound generator 520 may be a linear resonance actuator (LRA) that vibrates the display panel 300 by generating a magnetic force using a voice coil. The second sound generator 520 may include a lower chassis 521, a flexible circuit board 522, a voice coil 523, a magnet 524, a spring 525, and an upper chassis 526.

The lower chassis 521 and the upper chassis 526 may be formed of a metal material. The flexible circuit board 522 may be disposed on one surface of the lower chassis 521 facing the upper chassis 526, and may be connected to a second flexible circuit board 527. The voice coil 523 may be connected to one surface of the flexible circuit board 522 facing the upper chassis 526. Thus, one end of the voice coil 523 may be electrically connected to one of the lead lines of the second flexible circuit board 527, and the other end of the voice coil 523 may be electrically connected to the other one of the lead lines of the second flexible circuit board 527. The magnet 524 is a permanent magnet, and one surface of the magnet 524, facing the voice coil 523, may be provided with a voice coil groove 524a for accommodating the voice coil 523. The spring 525, which is an elastic body, is disposed between the magnet 524 and the upper chassis 526.

The direction of a current flowing in the voice coil 523 may be controlled by the first driving voltage applied to one end of the voice coil 523 and the second driving voltage applied to the other end of the voice coil 523. An applied magnetic field may be formed around the voice coil 523 in accordance with the current flowing in the voice coil 523. That is, the direction of the current flowing in the voice coil 523 when the first driving voltage is a positive polarity voltage and the second driving voltage is a negative polarity voltage is opposite to the direction of the current flowing in the voice coil 523 when the first driving voltage is a negative polarity and the second driving voltage is a positive polarity voltage. An attracting force and a repulsive force alternately act on the magnet 524 and the voice coil 523 in accordance with the AC driving of the first driving voltage and the second driving voltage. Therefore, the magnet 524 may reciprocate between the voice coil 523 and the upper chassis 526 by the spring 525.

Meanwhile, the vibration due to the reciprocation of the magnet 524 may be transmitted to both the lower chassis 521 and the upper chassis 526. Therefore, the lower chassis 521 may face the bracket 600, and the upper chassis 526 may face the display panel 300. Alternatively, the lower chassis 521 may face the display panel 300, and the upper chassis 526 may face the bracket 600.

According to the embodiment shown in FIG. 9, the bracket 600 may be vibrated by the reciprocation of the magnet 524 of the second sound generator 520, thereby outputting the second sound or providing a haptic sense.

Figure 10:
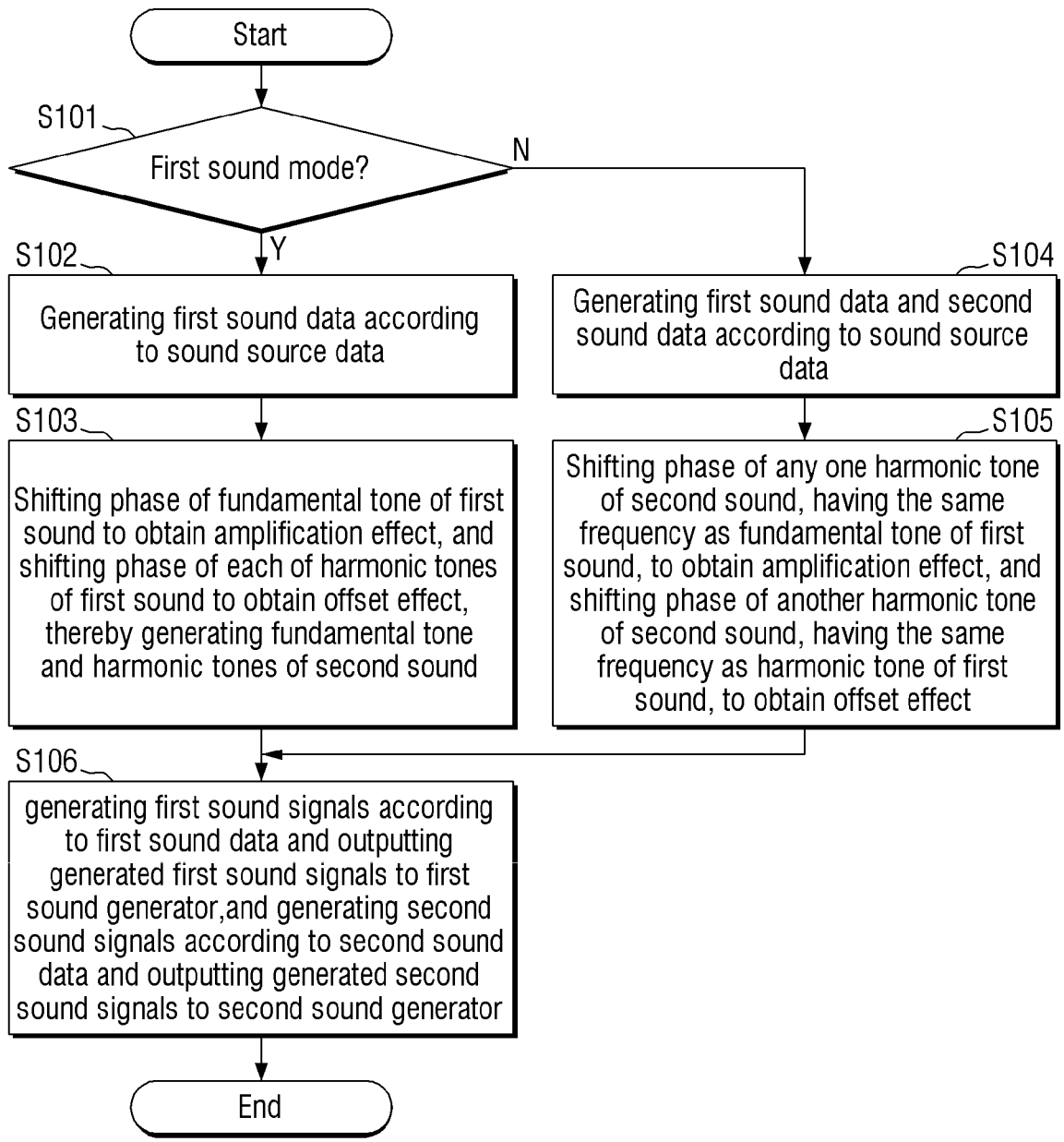
FIG. 10 is a flowchart showing a sound providing method of a display device according to an exemplary embodiment.

FIG. 10 is a flowchart showing a sound providing method of a display device according to an exemplary embodiment.

Referring to FIG. 10, first, the main processor 710 may select one of a first sound mode and a second sound mode (S101 of FIG. 10).

The first sound mode may be a mode for preventing or reducing the deterioration of sound quality due to harmonic tones of the first sound, and the second sound mode may be a mode for providing a sound having both a low frequency band and a high frequency band to a user.

Second, the main processor 710 may generate first sound data in the first sound mode and output the first sound data to the phase shifter 750 (S102 of FIG. 10).

The main processor 710 receives sound source data from the outside. The main processor 710 outputs the sound source data to the memory 740 and receives sound data from the memory 740. Because the memory 740 stores the sound data according to the frequency of the sound source data, the memory 740 may output the sound data to the main processor 710 using the frequency of the sound source data as an input address. The main processor 710 may generate the first sound data according to the sound data input from the memory 740. The main processor 710 outputs the first sound data to the phase shifter 750.

Figure 11:
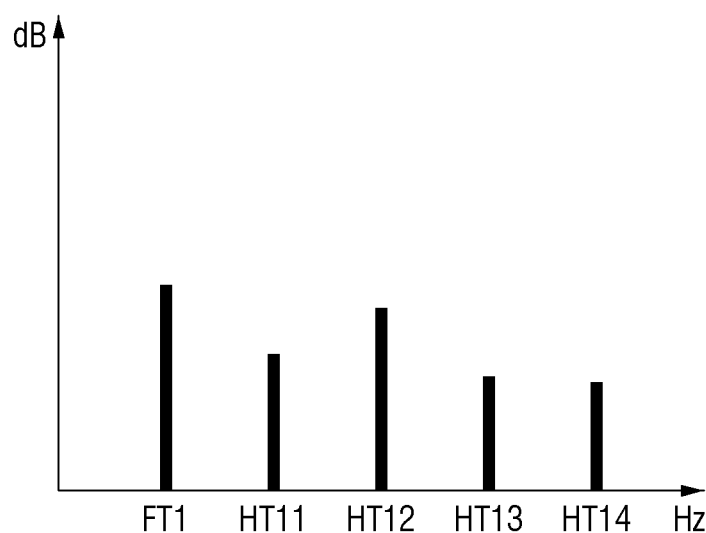
FIGS. 11-13 are graphs showing the sound pressure level of a first sound depending on a fundamental tone and harmonic tone according to an exemplary embodiment, the sound pressure level of a second sound depending on a fundamental tone and harmonic tone according to an exemplary embodiment, and the sound pressure level of a third sound, which is a sum of the first sound and the second sound, depending on a fundamental tone and harmonic tone according to an exemplary embodiment.
Figure 12:
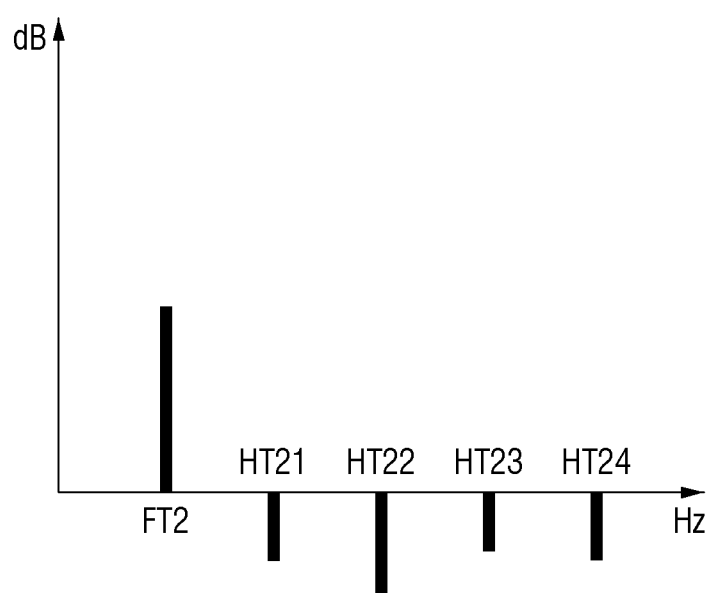

Third, the phase shifter 750 shifts the phase of each of a fundamental tone FT1 and first to fourth harmonic tones HT11, HT12, HT13, and HT14 of the first sound as shown in FIG. 11 to generate a fundamental tone FT2 and first to fourth harmonic tones HT21, HT22, HT23, and HT24 of the second sound as shown in FIG. 12. The phase shifter 750 may shift the phase of the fundamental tone FT1 of the first sound to generate the fundamental tone FT2 of the second sound so as to obtain the effect that (i.e., such that) the fundamental tone FT1 of the first sound is amplified (e.g., due to constructive interference) by the fundamental tone FT2 of the second sound. Further, the phase shifter 750 may shift the phase of each of the first to fourth harmonic tones HT11, HT12, HT13, and HT14 of the first sound to generate the first to fourth harmonic tones HT21, HT22, HT23, and HT24 of the second sound so as to obtain the effect that (i.e., such that) the first to fourth harmonic tones HT11, HT12, HT13, and HT14 of the first sound are offset (e.g., due to destructive interference) by the first to fourth harmonic tones HT21, HT22, HT23, and HT24 of the second sound (S103 of FIG. 10).

The phase shifter 750 modulates first sound data and outputs second sound data. The first sound includes a fundamental tone FT1 and harmonic tones HT11, HT12, HT13, and HT14, and the second sound includes a fundamental tone FT2 and harmonic tones HT21, HT22, HT23, and HT24. The first sound data includes information about the frequency and the sound pressure level or amplitude of a fundamental tone of the first sound, and the first sound data includes information about the frequencies and the sound pressure levels or amplitudes of harmonic tones of the first sound. The second sound data includes information about the frequency and the sound pressure level or amplitude of a fundamental tone of the second sound, and the second sound data includes information about the frequencies and the sound pressure levels or amplitudes of harmonic tones of the second sound.

Figure 14:
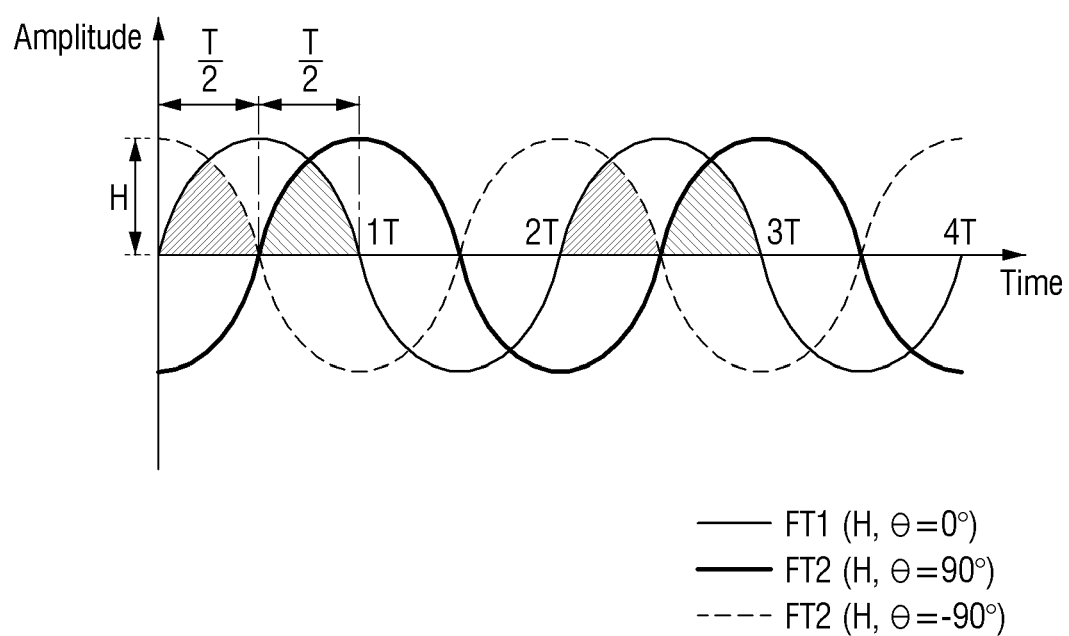
FIG. 14 is a waveform diagram showing the amplitudes of the fundamental tone of a first sound and the fundamental tone of a second sound depending on time according to an exemplary embodiment.
Figure 15:
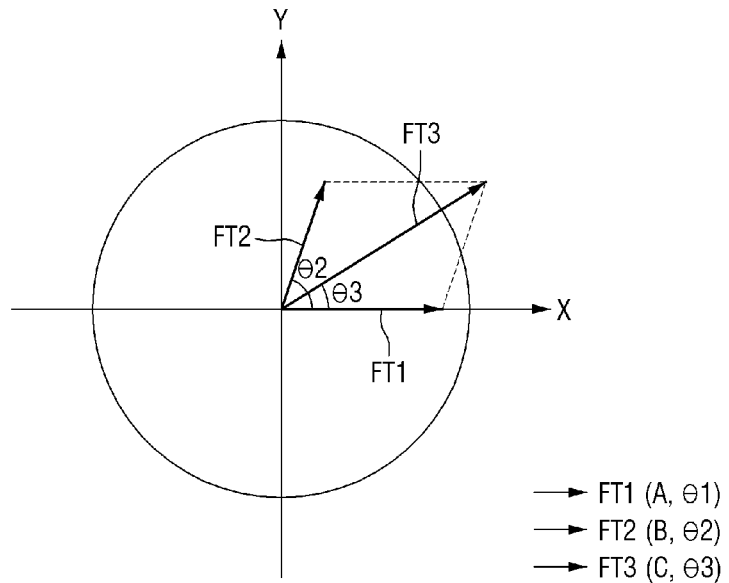
FIG. 15 is a view showing the phase and amplitude of a first sound, the phase and amplitude of a second sound, and the phase and amplitude of a third sound according to an exemplary embodiment.

The phase shifter 750 shifts the phase of the fundamental tone FT1 of the first sound (shown in FIG. 11) to generate the fundamental tone FT2 of the second sound (shown in FIG. 12), in order for the sound pressure level of a fundamental tone FT3 of the third sound (shown in FIG. 13), which is a sum of the first sound and the second sound, to be higher than (or greater than) the sound pressure level of the fundamental tone FT1 of the first sound. The time period during which the positive amplitude region of the fundamental tone FT1 of the first sound overlaps the positive amplitude region of the fundamental tone FT2 of the second sound may be T/2 or more as shown in FIG. 14. Therefore, the difference between the phase θ1 of the fundamental tone FT1 of the first sound and the phase θ2 of the fundamental tone FT2 of the second sound may be in a range from −90° to 90° as shown in FIG. 15. In this case, the amplitude C of the fundamental tone FT3 of the third sound may be larger than (or greater than) the amplitude A of the fundamental tone FT1 of the first sound and the amplitude B of the fundamental tone FT2 of the second sound.

It is illustrated in FIG. 14 that each of the period of the fundamental tone FT1 of the first sound and the period of the fundamental tone FT2 of the second sound is 2 T. Further, it is illustrated in FIG. 14 that each of the amplitude of the fundamental tone FT1 of the first sound and the amplitude of the fundamental tone FT2 of the second sound is H. Further, it is illustrated in FIG. 15 that the amplitude of the fundamental tone FT1 of the first sound is A and the phase thereof is θ1, the amplitude of the fundamental tone FT2 of the second sound is B and the phase thereof is θ2, and the amplitude of the fundamental tone FT3 of the third sound is C and the phase thereof is θ3. In FIG. 15, θ1 may be 0°, each of θ2 and θ3 may be less than 90°, and θ3 may have a value between θ1 and θ2.

The phase shifter 750 shifts the phases of the respective harmonic tones HT11, HT12, HT13 and HT14 of the first sound to generate the harmonic tones HT21, HT22, HT23 and HT24 of the second sound. In order for the sound pressure level of each of the harmonic tones HT31, HT32, HT33, and HT34 of the third sound to be lower than (or less than) the sound pressure level of each of the harmonic tones HT11, HT12, HT13, and HT14 of the first sound, the difference between the phase of each of the harmonic tones HT11, HT12, HT13 and HT14 of the first sound and the phase of each of the harmonic tones HT21, HT22, HT23, and HT24 of the second sound may be within the second range.

Figure 16:
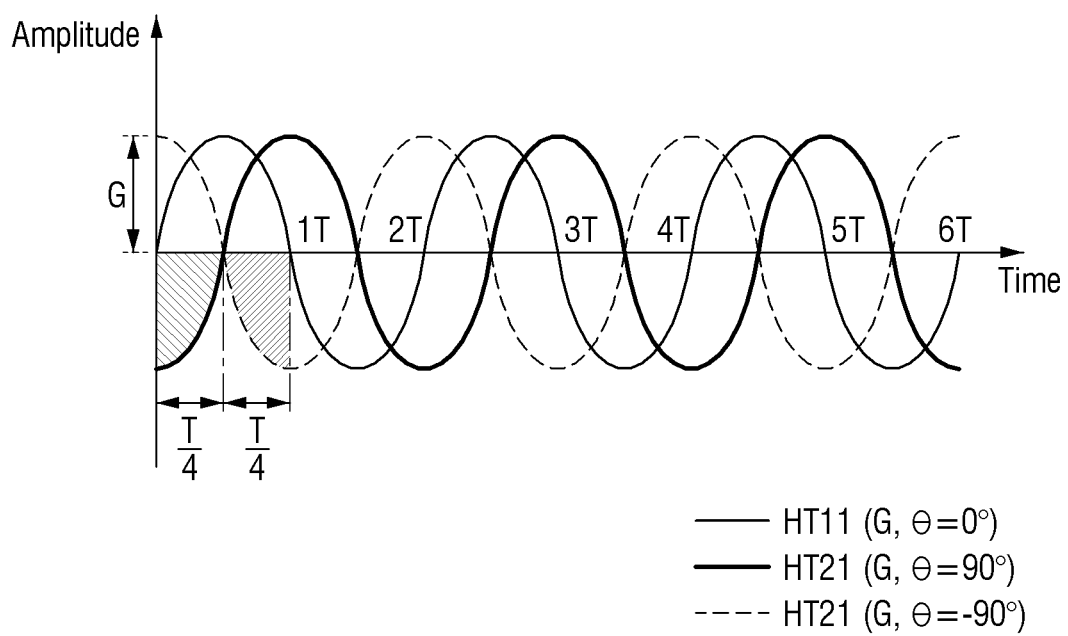
FIG. 16 is a waveform diagram showing the amplitudes of the first harmonic tone of a first sound and the first harmonic tone of a second sound depending on time according to an exemplary embodiment.
Figure 17:
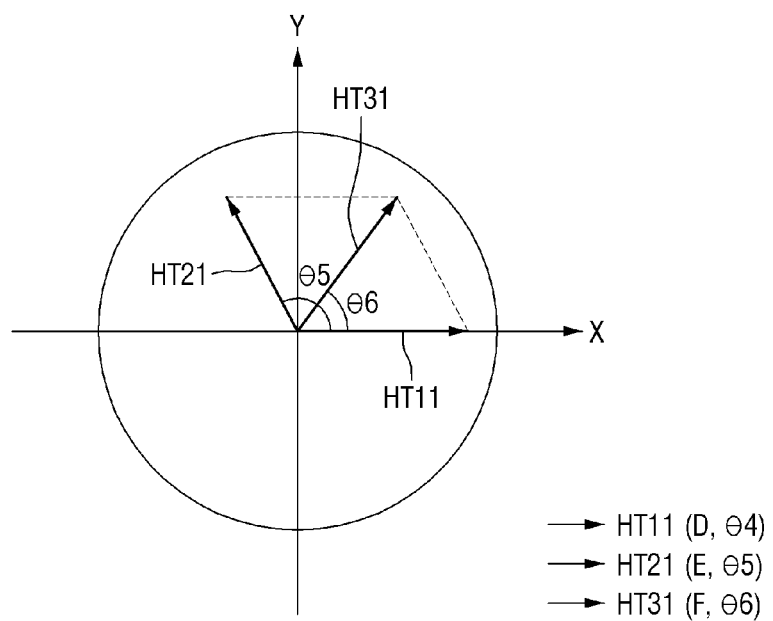
FIG. 17 is a view showing the phase and amplitude of a first sound, the phase and amplitude of a second sound, and the phase and amplitude of a third sound according to an exemplary embodiment.

For example, in order for the sound pressure level of the first harmonic tone HT31 of the third sound (shown in FIG. 13) to be lower than (or less than) the sound pressure level of the first harmonic tone HT11 of the first sound (shown in FIG. 11), the time period during which the positive amplitude region of the first harmonic tone HT11 of the first sound overlaps the negative amplitude region of the first harmonic tone HT21 of the second sound may be T/4 or more as shown in FIG. 16. Therefore, the difference between the phase θ4 of the first harmonic tone HT11 of the first sound and the phase θ5 of the first harmonic tone HT21 of the second sound may be less than −90° and more than 90° as shown in FIG. 17. In this case, the amplitude F of the first harmonic tone HT31 of the third sound may be smaller than (or less than) the amplitude D of the first harmonic tone HT11 of the first sound and the amplitude E of the first harmonic tone HT21 of the second sound.

In FIG. 16, each of the period of the fundamental tone FT1 of the first sound and the period of the fundamental tone FT2 of the second sound is 1 T. Further, as shown in FIG. 16, each of the amplitude of the first harmonic tone HT11 of the first sound and the amplitude of the first harmonic tone HT21 of the second sound is G. Further, as shown in FIG. 17, the amplitude of the first harmonic tone HT11 of the first sound is D and the phase thereof is θ4, the amplitude of the first harmonic tone HT21 of the second sound is E and the phase thereof is θ5, and the amplitude of the first harmonic tone HT31 of the first sound is F and the phase thereof is θ6. In FIG. 17, θ4 may be 0°, θ5 may be more than 90°, and θ6 may have a value between θ4 and θ5.

Figure 13:
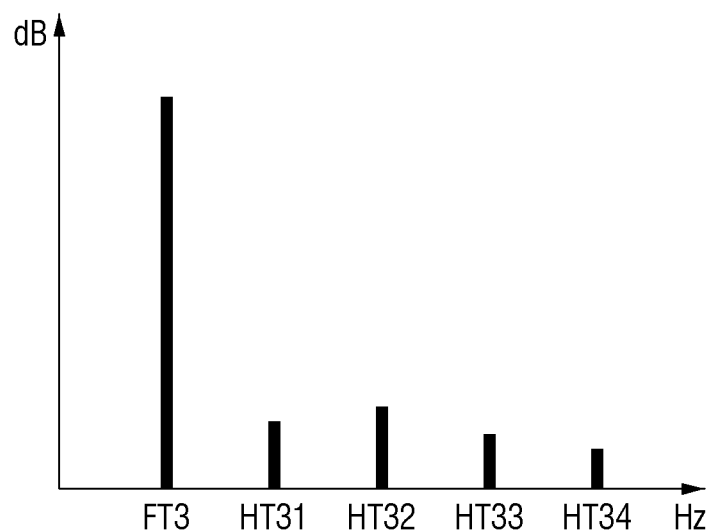

As shown in FIG. 13, in order for the sound pressure level of the second harmonic tone HT32 of the third sound to be lower than (or less than) the sound pressure level of the second harmonic tone HT12 of the first sound, the time period during which the positive amplitude region of the second harmonic tone HT12 of the first sound overlaps the negative amplitude region of the second harmonic tone HT22 of the second sound may be T/4 or more. In this case, the difference between the phase of the second harmonic tone HT12 of the first sound and the phase of the second harmonic tone HT22 of the second sound may be less than −90° and more than 90°. Further, the amplitude of the second harmonic tone HT32 of the third sound may be smaller than (or less than) the amplitude of the second harmonic tone HT12 of the first sound and the amplitude of the second harmonic tone HT22 of the second sound.

As shown in FIG. 13, in order for the sound pressure level of the third harmonic tone HT33 of the third sound to be lower than (or less than) the sound pressure level of the third harmonic tone HT13 of the first sound, the time period during which the positive amplitude region of the third harmonic tone HT13 of the first sound overlaps the negative amplitude region of the third harmonic tone HT23 of the second sound may be T/4 or more. Therefore, the difference between the phase of the third harmonic tone HT13 of the first sound and the phase of the third harmonic tone HT23 of the second sound may be less than −90° and more than 90°. Further, the amplitude of the third harmonic tone HT33 of the third sound may be smaller than (or less than) the amplitude of the third harmonic tone HT13 of the first sound and the amplitude of the third harmonic tone HT23 of the second sound.

As shown in FIG. 13, in order for the sound pressure level of the fourth harmonic tone HT34 of the third sound to be lower than (or less than) the sound pressure level of the fourth harmonic tone HT14 of the first sound, the time period during which the positive amplitude region of the fourth harmonic tone HT14 of the first sound overlaps the negative amplitude region of the fourth harmonic tone HT24 of the second sound may be T/4 or more. For this, the difference between the phase of the fourth harmonic tone HT14 of the first sound and the phase of the fourth harmonic tone HT24 of the second sound may be less than −90° and more than 90°. Further, the amplitude of the fourth harmonic tone HT34 of the third sound may be smaller than (or less than) the amplitude of the fourth harmonic tone HT14 of the first sound and the amplitude of the fourth harmonic tone HT24 of the second sound.

Because the phase shifter 750 shifts the phase of each of the fundamental tone and harmonic tones of the first sound to generate the fundamental tone and harmonic tones of the second sound, the frequency of the fundamental tone FT1 of the first sound may be substantially the same as the frequency of the fundamental tone FT2 of the second sound. Further, the frequency of each of the harmonic tones HT11, HT12, HT13 and HT14 of the first sound may be substantially the same as the frequency of each of the harmonic tones HT21, HT22, HT23 and HT24 of the second sound. For example, the frequency of the first harmonic tone HT11 of the first sound may be substantially the same as the frequency of the first harmonic tone HT21 of the second sound. The frequency of the second harmonic tone HT12 of the first sound may be substantially the same as the frequency of the second harmonic tone HT22 of the second sound. The frequency of the third harmonic tone HT13 of the first sound may be substantially the same as the frequency of the third harmonic tone HT23 of the second sound. The frequency of the fourth harmonic tone HT14 of the first sound may be substantially the same as the frequency of the fourth harmonic tone HT24 of the second sound.

The sound pressure level or amplitude of the fundamental tone FT1 of the first sound may be different from the sound pressure level or amplitude of the fundamental tone FT2 of the second sound. When the sound pressure level or amplitude of the first harmonic tone HT11 of the first sound is substantially the same as the sound pressure level or amplitude of the first harmonic tone HT21 of the second sound, the sound pressure level of the first harmonic tone HT31 of the third sound may be reduced or minimized. However, even when the sound pressure level or amplitude of the first harmonic tone HT11 of the first sound is different from the sound pressure level or amplitude of the first harmonic tone HT21 of the second sound, the sound pressure level or amplitude of the first harmonic tone HT31 of the third sound may be lower than (or less than) the sound pressure level or amplitude of the first tone HT11 of the first sound. Accordingly, the sound pressure level or amplitude of the first harmonic tone HT11 of the first sound may not be substantially the same as the sound pressure level or amplitude of the first harmonic tone HT21 of the second sound. The sound pressure level or amplitude of the second harmonic tone HT12 of the first sound may also be substantially the same as or different from the sound pressure level or amplitude of the second harmonic tone HT22 of the second sound. The sound pressure level or amplitude of the third harmonic tone HT13 of the first sound may also be substantially the same as or different from the sound pressure level or amplitude of the third harmonic tone HT23 of the second sound. The sound pressure level or amplitude of the fourth harmonic tone HT14 of the first sound may also be substantially the same as or different from the sound pressure level or amplitude of the fourth harmonic tone HT24 of the second sound.

Meanwhile, in order to obtain an amplification effect that the sound pressure level of the fundamental tone of the third sound, which is a sum of the first sound and the second sound, becomes higher than (or greater than) the sound pressure level of the fundamental tone of the first sound or to obtain an offset effect that the sound pressure level of at least one of the harmonic tones of the third sound becomes lower than (or less than) the sound pressure level of at least one of the harmonic tones of the first sound, information about the distance between the first sound generator 510 and the second sound generator 520 is desirable. The phase shifter 750 stores the information about the distance between the first sound generator 510 and the second sound generator 520. Therefore, in order to obtain the desired amplification effect or the desired offset effect, the phase shifter 750 may calculate how much the phase of each of the fundamental tone and harmonic tones of the first sound should be shifted.

The phase shifter 750 may output second sound data including information about the frequency and sound pressure level or amplitude of a fundamental tone of the second sound to the second sound driver 760, and may output second sound data including information about the frequencies and sound pressure levels or amplitudes of harmonic tones of the second sound in the first sound mode to the second sound driver 760.

Meanwhile, for convenience of explanation, it is shown in FIGS. 11-13 that the harmonic tones of the second sound, having opposite phases to the harmonic tones of the first sound, are arranged in a direction opposite to the Y-axis direction (i.e., harmonic tones having opposing phases are arranged on opposing sides of the Y-axis).

In the act S103 of FIG. 10, due to the phase shifter 750, an amplification effect that the sound pressure level of the fundamental tone of the third sound, which is a sum of the first sound and the second sound, becomes higher than (or greater than) the sound pressure level of the fundamental tone of the first sound can be obtained, and concurrently (e.g., simultaneously) an offset effect that the sound pressure level of any one of the harmonic tones of the third sound becomes lower than (or less than) the sound pressure level of any one of the harmonic tones of the first sound can be obtained. Therefore, it is possible to prevent or reduce the deterioration of sound quality provided to the user due to the harmonic tones of the first sound and to provide a high-quality sound by increasing the sound pressure level of the fundamental tone of the first sound.

Fourth, the main processor 710 may generate first sound data and second sound data in the second sound mode and output the first sound data and the second sound data to the phase shifter 750 (S104 of FIG. 10).

The main processor 710 outputs sound source data to the memory 740 and receives sound data from the memory 740. Because the memory 740 stores the sound data according to the frequency of the sound source data, the memory 740 may output the sound data to the main processor 710 using the frequency of the sound source data as an input address. The main processor 710 may generate the first sound data and the second sound data according to the sound data input from the memory 740. The main processor 710 outputs the first sound data and the second sound data to the phase shifter 750.

Fifth, the phase shifter 750 shifts the phase of the harmonic tone of the second sound having the same frequency as any one of the fundamental tone and harmonic tones of the first sound (S105 of FIG. 10).

Figure 18:
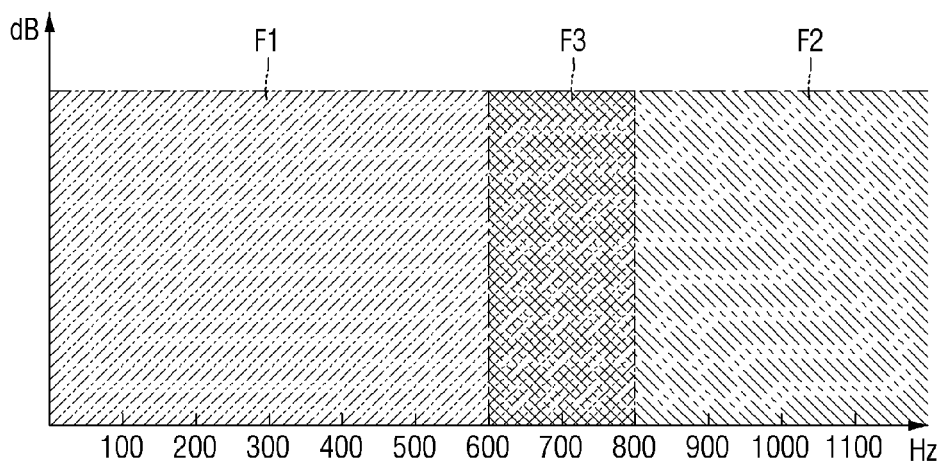
FIG. 18 is a view showing the first frequency band of a first sound, the second frequency band of a second sound, and the third frequency band which is a frequency band overlapping the first frequency band and the second frequency band according to an exemplary embodiment.

When the first sound generator 510 is a piezoelectric element or a piezoelectric actuator and the second sound generator 520 is a linear resonant actuator LRA, the first sound generator 510 outputs a first sound of a relatively higher frequency band than the second sound generator 520, and the second sound generator 520 outputs a second sound of a relatively lower frequency band than the first sound generator 510. For example, as shown in FIG. 18, when the first frequency band F1 indicating the frequency band of the first sound is 0 Hz to 800 Hz (e.g., the frequency band could be 100 Hz to 800 Hz in other embodiments) and the second frequency band F2 indicating the frequency band of the second sound is 600 Hz to 2 kHz, the third frequency band F3 in which the first frequency band F1 and the second frequency band F2 overlap each other may be 600 Hz to 800 Hz. The phase shifter 750 may increase the sound pressure level of the fundamental tone of the first sound or decrease the sound pressure level of any one of the harmonic tones of the first sound by using the harmonic tones of the second sound having the same frequency as each of the fundamental tone and harmonic tones of the third frequency band F3 from among the fundamental tone and harmonic tones of the first sound.

The phase shifter 750 may shift the phase of any one harmonic tone of the second sound having the same frequency as the fundamental tone of the first sound. In order to increase the sound pressure level of the fundamental tone of the first sound, the time period during which the positive amplitude region of the fundamental tone of the first sound overlaps the positive amplitude region of any one harmonic tone of the second sound may be T/4 or more. In this case, the difference between the phase of the fundamental tone of the first sound and the phase of any one harmonic tone of the second sound may be in a range from −90° to 90°.

The phase shifter 750 may shift the phase of another harmonic tone of the second sound having the same frequency as any one harmonic tone of the first sound. In order to increase the sound pressure level of any one harmonic tone of the first sound, the time period during which the positive amplitude region of any one harmonic tone of the first sound overlaps the negative amplitude region of another harmonic tone of the second sound may be T/4 or more. In this case, the difference between the phase of any one harmonic tone of the first sound and the phase of another harmonic tone of the second sound may be less than −90° and more than 90°.

The phase shifter 750 may output the first sound data to the first sound driver 340 in the second sound mode, and may output the second sound data to the second sound driver 760 in the second sound mode.

In the act S105 of FIG. 10, due to the phase shifter 750, an amplification effect of increasing the sound pressure level of the fundamental tone of the first sound can be obtained, and concurrently (e.g., simultaneously) an offset effect of decreasing the sound pressure level of any one of the harmonic tones of the first sound can be obtained. Therefore, it is possible to prevent or reduce the deterioration of sound quality provided to the user due to the harmonic tones of the first sound and to provide a high-quality sound by increasing the sound pressure level of the fundamental tone of the first sound.

Sixth, the first sound driver 340 may generate first sound signals according to the first sound data and output the first sound signals to the first sound generator 510, and may generate second sound signals according to the second sound data and output the second sound signals to the second sound generator 520 (S106 of FIG. 10).

The first sound driver 340 receives the first sound data from the main circuit board 700. The first sound driver 340 may generate the first sound signals including first and second sound driving voltages according to the first sound data. For this purpose, the first sound driver 340 may include a digital signal processor (DSP) for processing sound data which are digital signals, a digital-analog converter (DAC)

for converting the sound data output from the digital signal processor into sound driving voltages which are analog signals, and an amplifier (AMP) for amplifying and outputting the sound driving voltages. The first sound driver 340 may output the first sound signals to the first sound generator 510.

The second sound driver 760 receives the second sound data from the phase shifter 750. The second sound driver 760 may generate the second sound signals including third and fourth sound driving voltages according to the second sound data. For this purpose, the second sound driver 760 may include a digital signal processor (DSP) for processing sound data which are digital signals, a digital-analog converter (DAC) for converting the sound data output from the digital signal processor into sound driving voltages which are analog signals, and an amplifier (AMP) for amplifying and outputting the sound driving voltages. The second sound driver 760 may output the second sound signals to the second sound generator 520.

The first sound generator 510 may vibrate the display panel 300 according to the first sound signals, and thus the first sound may be output. The second sound generator 520 may vibrate the display panel 300 according to the second sound signals, and thus the second sound may be output.

Figure 19:
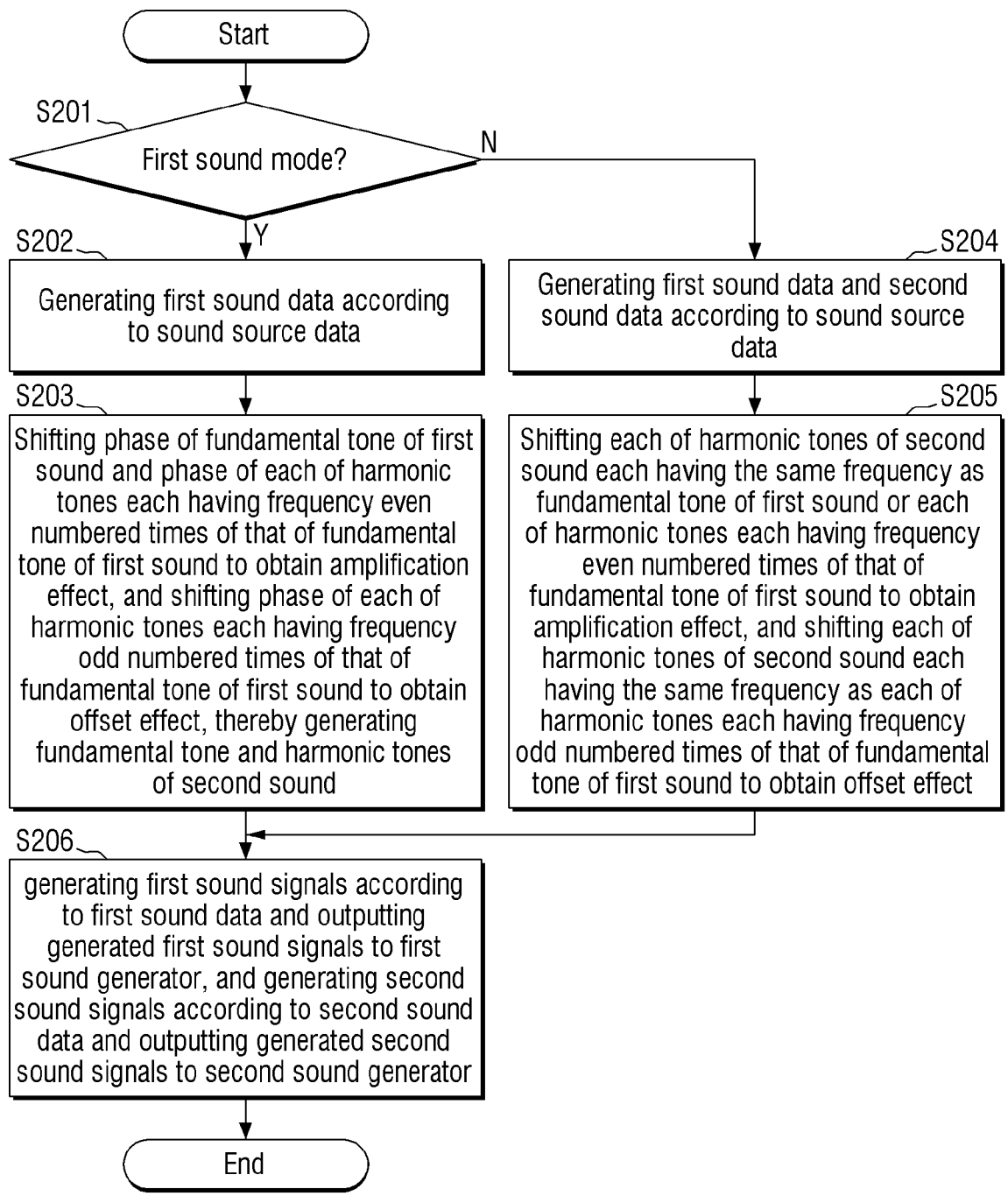
FIG. 19 is a flowchart showing a sound providing method of a display device according to another embodiment according to an exemplary embodiment.

FIG. 19 is a flowchart showing a sound providing method of a display device according to an exemplary embodiment.

The acts S201, S202, S204, and S206 in the embodiment shown in FIG. 19 are substantially the same as the acts S101, S102, S104, and S106 in the embodiment shown in FIG. 10, except for the step S203 and S205. Therefore, a description of the acts S201, S202, S204, and S206 in the embodiment shown in FIG. 19 may be omitted (e.g., may not be repeated).

Figure 20:
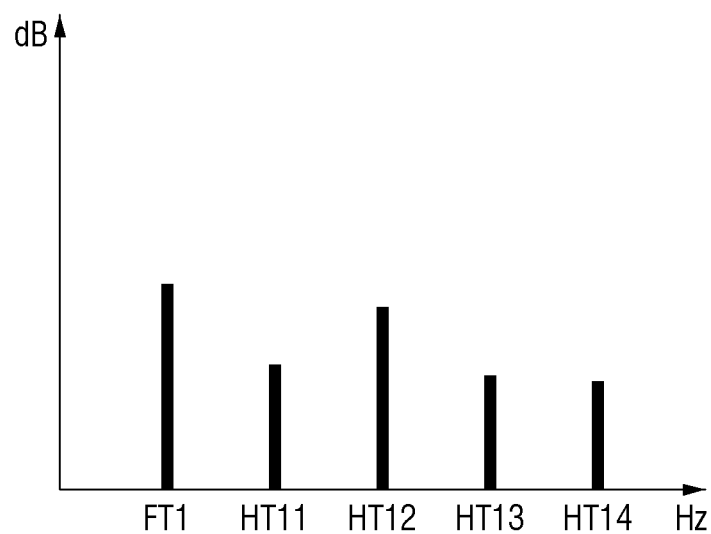
FIGS. 20-22 are graphs showing the sound pressure level and phase of a first sound depending on a frequency according to an exemplary embodiment, the sound pressure level and phase of a second sound depending on a frequency according to an exemplary embodiment, and the sound pressure level of a third sound, which is a sum of the first sound and the second sound, depending on a frequency according to an exemplary embodiment.
Figure 21:
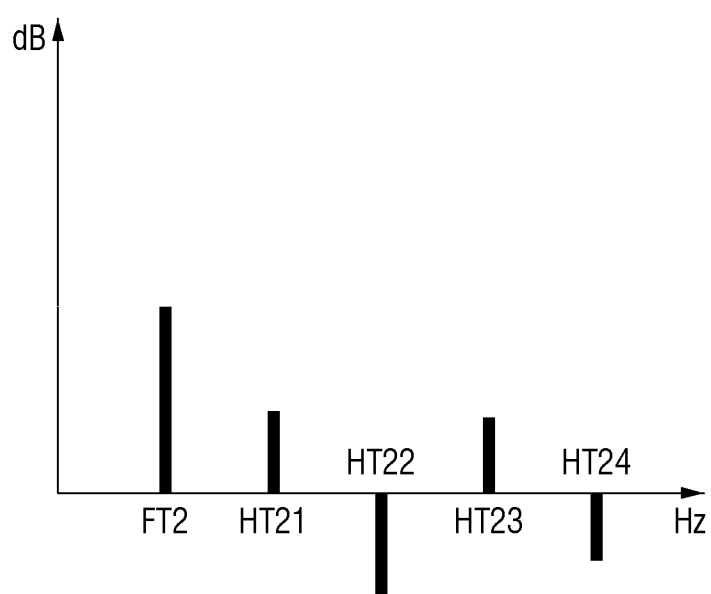
Figure 22:
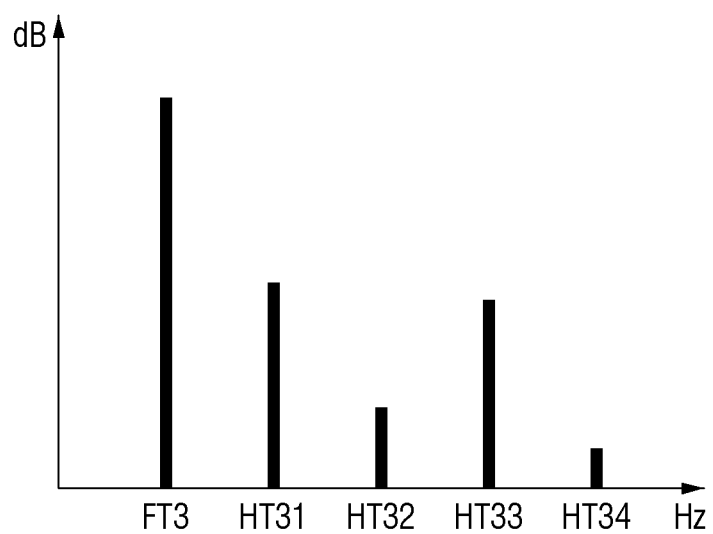

Referring to FIG. 19, the phase shifter 750 shifts the phase of each of the fundamental tone FT1 and first to fourth harmonic tones HT11, HT12, HT13, and HT14 of the first sound as shown in FIG. 20 to generate a fundamental tone FT2 and first to fourth harmonic tones HT21, HT22, HT23, and HT24 of the second sound as shown in FIG. 21. The phase shifter 750 may shift the phase of the fundamental tone FT1 of the first sound so as to obtain the effect that the fundamental tone FT1 of the first sound is amplified by the fundamental tone FT2 of the second sound to generate the fundamental tone FT2 of the second sound. Further, the phase shifter 750 may shift the phase of each of the first harmonic tone HT11 and third harmonic tone HT13 of the first sound to generate the first harmonic tone HT21 and the third harmonic tone HT23 of the second sound so as to obtain the effect that the first harmonic tone HT11 and the third harmonic tone HT13 each having a frequency even numbered times of that of the fundamental tone FT1 of the first sound are amplified by the first harmonic tone HT21 and third harmonic tone HT23 of the second sound. Further, the phase shifter 750 may shift the phase of each of the second harmonic tone HT12 and fourth harmonic tone HT14 of the first sound to generate the second harmonic tone HT22 and the fourth harmonic tone HT24 of the second sound so as to obtain the effect that the second harmonic tone HT12 and fourth harmonic tone HT14 each having a frequency odd numbered times of that of the fundamental tone FT1 of the first sound are offset by the second harmonic tone HT22 and the fourth harmonic tone HT24 of the second sound (S203 of FIG. 19).

For example, when the frequency of the fundamental tone FT1 of the first sound is 300 Hz, the frequency of the first harmonic tone HT11 of the first sound having a frequency two times of that of the fundamental tone FT1 of the first sound may be 600 Hz, and the frequency of the second harmonic tone HT12 of the first sound having a frequency three times of that of the fundamental sound FT1 of the first sound may be 900 Hz. Further, the frequency of the third harmonic tone HT13 of the first sound having a frequency four times of that of the fundamental tone FT1 of the first sound may be 1200 Hz, and the frequency of the fourth harmonic tone HT14 of the first sound having a frequency five times of that of the fundamental sound FT1 of the first sound may be 1500 Hz.

The phase shifter 750 modulates first sound data and outputs second sound data. The first sound includes a fundamental tone FT1 and harmonic tones HT11, HT12, HT13, and HT14, and the second sound includes a fundamental tone FT2 and harmonic tones HT21, HT22, HT23, and HT24. The first sound data includes information about the frequency and the sound pressure level or amplitude of a fundamental tone of the first sound, and information about the frequencies and the sound pressure levels or amplitudes of harmonic tones of the first sound. The second sound data includes information about the frequency and the sound pressure level or amplitude of a fundamental tone of the second sound, and information about the frequencies and the sound pressure levels or amplitudes of harmonic tones of the second sound.

Because a description that the phase shifter 750 shifts the phase of the fundamental tone FT1 of the first sound to generate the fundamental tone FT2 of the second sound, and shifts the phase of each of the second harmonic tone HT12 and fourth harmonic tone HT24 of the second sound to generate the second harmonic tone HT22 and fourth harmonic tone HT24 of the second sound is substantially the same as that having been described in the act S103 of FIG. 10, the description thereof may be omitted (e.g., may not be repeated).

In order for the sound pressure level of the first harmonic tone HT31 of the third sound to be higher than (or greater than) the sound pressure level of the first harmonic tone HT11 of the first sound, the time period during which the positive amplitude region of the first harmonic tone HT11 of the first sound overlaps the positive amplitude region of the first harmonic tone HT21 of the second sound may be ¼ or more of the period of the first harmonic tone HT11 of the first sound. For this, the difference between the phase of the first harmonic tone HT11 of the first sound and the phase of the first harmonic tone HT21 of the second sound may be in a range from −90° to 90°. In this case, the amplitude of the first harmonic tone HT31 of the third sound may be larger than (or greater than) the amplitude of the first harmonic tone HT11 of the first sound and the amplitude of the first harmonic tone HT21 of the second sound.

In order for the sound pressure level of the third harmonic tone HT33 of the third sound to be higher than (or greater than) the sound pressure level of the third harmonic tone HT13 of the first sound, the time period during which the positive amplitude region of the third harmonic tone HT13 of the first sound overlaps the positive amplitude region of the third harmonic tone HT23 of the second sound may be ¼ or more of the period of the third harmonic tone HT13 of the first sound. For this, the difference between the phase of the third harmonic tone HT13 of the first sound and the phase of the third harmonic tone HT23 of the second sound may be in a range from −90° to 90°. In this case, the amplitude of the third harmonic tone HT33 of the third sound may be smaller than (or less than) the amplitude of the third harmonic tone HT13 of the first sound and the amplitude of the third harmonic tone HT23 of the second sound.

Because the phase shifter 750 shifts each of the fundamental tone and harmonic tones of the first sound to generate the fundamental tone and harmonic tones of the second sound, the frequency of the fundamental tone FT1 of the first sound may be substantially the same as the frequency of the fundamental tone FT2 of the second sound. Further, the frequency of each of the harmonic tones HT11, HT12, HT13, and HT14 of the first sound may be substantially the same as the frequency of each of the harmonic tones HT21, HT22, HT23, and HT24 of the second sound. For example, the frequency of the first harmonic tone FT11 of the first sound may be substantially the same as the frequency of the first harmonic tone FT21 of the second sound. The frequency of the second harmonic tone FT12 of the first sound may be substantially the same as the frequency of the second harmonic tone FT22 of the second sound. The frequency of the third harmonic tone FT13 of the first sound may be substantially the same as the frequency of the third harmonic tone FT23 of the second sound.

The frequency of the fourth harmonic tone FT14 of the first sound may be substantially the same as the frequency of the fourth harmonic tone FT24 of the second sound.

The sound pressure level or amplitude of the fundamental tone FT1 of the first sound may be different from the sound pressure level or amplitude of the fundamental tone FT2 of the second sound. The sound pressure level or amplitude of the first harmonic tone HT11 of the first sound may be different from the sound pressure level or amplitude of the first harmonic tone HT21 of the second sound. The sound pressure level or amplitude of the third harmonic tone HT13 of the first sound may be different from the sound pressure level or amplitude of the third harmonic tone HT23 of the second sound.

When the sound pressure level or amplitude of the second harmonic tone HT12 of the first sound is substantially the same as the sound pressure level or amplitude of the second harmonic tone HT22 of the second sound, the sound pressure level of the second harmonic tone HT32 of the third sound may be minimized or reduced. However, even when the sound pressure level or amplitude of the second harmonic tone HT12 of the first sound is different from the sound pressure level or amplitude of the second harmonic tone HT22 of the second sound, the sound pressure level or amplitude of the second harmonic tone HT32 of the third sound may be lower than (or less than) the sound pressure level or amplitude of the second tone HT12 of the first sound. Accordingly, in some embodiments, the sound pressure level or amplitude of the second harmonic tone HT12 of the first sound may not be substantially the same as the sound pressure level or amplitude of the second harmonic tone HT22 of the second sound. The sound pressure level or amplitude of the fourth harmonic tone HT14 of the first sound may also be substantially the same as or different from the sound pressure level or amplitude of the fourth harmonic tone HT24 of the second sound.

Meanwhile, in order to obtain an amplification effect that the sound pressure level of the fundamental tone of the third sound, which is a sum of the first sound and the second sound, becomes higher than (or greater than) the sound pressure level of the fundamental tone of the first sound or to obtain an offset effect that the sound pressure level of at least one of the harmonic tones of the third sound becomes lower than (or less than) the sound pressure level of at least one of the harmonic tones of the first sound, information about the distance between the first sound generator 510 and the second sound generator 520 is desirable. The phase shifter 750 stores the information about the distance between the first sound generator 510 and the second sound generator 520. Therefore, in order to obtain the amplification effect or the offset effect, the phase shifter 750 may calculate how much the phase of each of the fundamental tone and harmonic tones of the first sound should be shifted.

According to the act S203 of FIG. 19, due to the phase shifter 750, an offset effect that the sound pressure levels of the harmonic tones each having a different tone from the fundamental tone of the first sound can be obtained, and concurrently (e.g., simultaneously) an amplification effect that the sound pressure levels of the harmonic tones each having the same tone as the fundamental tone of the first sound can be obtained. Therefore, it is possible to prevent or reduce the deterioration of sound quality provided to the user due to the harmonic tones each having a different tone from the fundamental tone of the first sound and to provide a high-quality sound by increasing the sound pressure levels of the harmonic tones each having the same tone as the fundamental tone of the first sound.

Further, the phase shifter 750 shifts the phase of the harmonic tone of the second sound, having the same frequency as the fundamental tone or at least one harmonic tone of the first sound. The phase shifter 750 may shift the phase of the harmonic tone of the second sound, having the same frequency as the fundamental tone FT1 of the first sound, so as to obtain the effect that the fundamental tone FT1 of the first sound is amplified by the harmonic tone of the second sound. Further, the phase shifter 750 may shift the phase of the harmonic tone of the second sound, having a frequency even numbered times of that of the fundamental tone of the first sound, so as to obtain the effect that the harmonic tone of the first sound, having a frequency even numbered times of that of the fundamental tone of the first sound, is amplified by the harmonic tone of the second sound. Further, the phase shifter 750 may shift the phase of the harmonic tone of the second sound, having a frequency odd numbered times of that of the fundamental tone of the first sound, so as to obtain the effect that the harmonic tone of the first sound, having a frequency odd numbered times of that of the fundamental tone of the first sound, is offset by the harmonic tone of the second sound (S205 of FIG. 19).

The phase shifter 750 may shift the phase of the harmonic tone of the second sound, having the same frequency as the fundamental tone of the first sound. In order to increase the sound pressure level of the fundamental tone of the first sound, the time period during which the positive amplitude region of the fundamental tone of the first sound overlaps the positive amplitude region of the harmonic tone of the second sound may be ¼ or more of the period of the fundamental tone of the first sound. In this case, the difference between the phase of the fundamental tone of the first sound and the phase of the harmonic tone of the second sound may be in a range from −90° to 90°.

The phase shifter 750 may shift the phase of the harmonic tone of the second sound, having the same frequency as the harmonic tone having a frequency odd numbered times of that of the fundamental tone of the first sound. In order to increase the sound pressure level of the harmonic tone having a frequency odd numbered times of that of the fundamental tone of the first sound, the time period during which the positive amplitude region of the harmonic tone having a frequency odd numbered times of that of the fundamental tone of the first sound overlaps the negative amplitude region of the harmonic tone of the second sound may be ¼ or more of the harmonic tone having a frequency odd numbered times of that of the fundamental tone of the first sound. In this case, the difference between the phase of the harmonic tone having a frequency odd numbered times of that of the fundamental tone of the first sound and the phase of the harmonic tone of the second sound may be less than −90° and more than 90°.

The phase shifter 750 may output the first sound data to the first sound driver 340 in the second sound mode, and may output the second sound data to the second sound driver 760 in the second sound mode.

According to the act S205 of FIG. 19, due to the phase shifter 750, an offset effect that the sound pressure levels of the harmonic tones each having a different tone from the fundamental tone of the first sound can be obtained, and concurrently (e.g., simultaneously) an amplification effect that the sound pressure levels of the harmonic tones each having the same tone as the fundamental tone of the first sound can be obtained. Therefore, it is possible to prevent or reduce the deterioration of sound quality provided to the user due to the harmonic tones each having a different tone (i.e., the harmonic tones having a frequency that is an odd integer multiple of the frequency of the fundamental tone) from the fundamental tone of the first sound and to provide a high-quality sound by increasing the sound pressure levels of the harmonic tones each having the same tone (i.e., the harmonic tones having a frequency that is an even integer multiple of the frequency of the fundamental tone) as the fundamental tone of the first sound.

Figure 23:
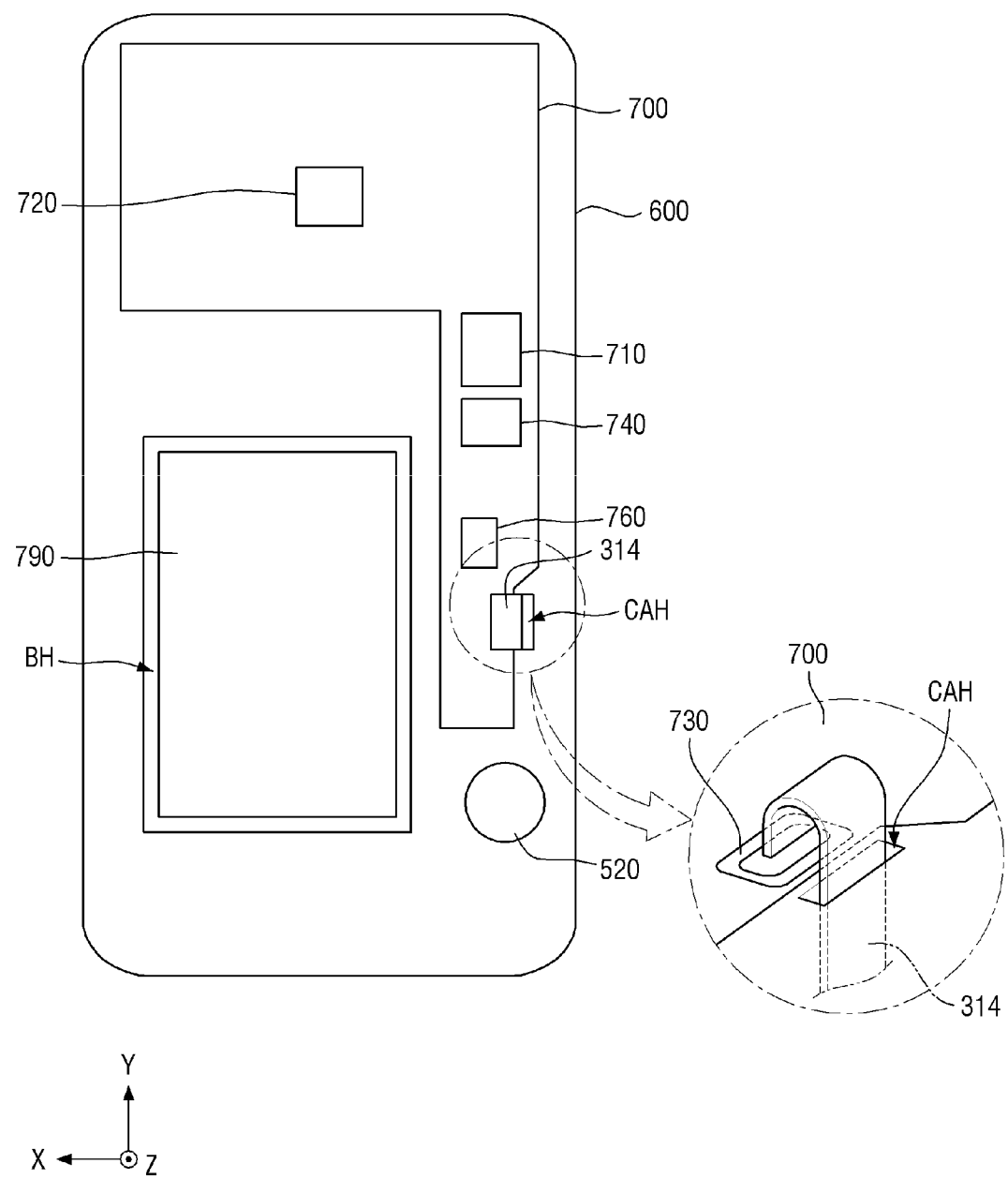
FIG. 23 is a bottom view showing a bracket attached to the lower surface of the display panel of FIG. 3 and a main circuit board disposed on the bracket according to an exemplary embodiment.

FIG. 23 is a bottom view showing a bracket attached to the lower surface of the display panel of FIG. 3 and a main circuit board disposed on the bracket according to an exemplary embodiment.

The embodiment shown in FIG. 23 is different from the embodiment shown in FIG. 4 in that the memory 740, instead of the phase shifter 750, includes a look-up table 741. In FIG. 23, a description substantially the same as the embodiment shown in FIG. 4 may be omitted (e.g., may not be repeated).

Referring to FIG. 23, the look-up table 741 receives frequency information of a fundamental tone and harmonic tones of a first sound from the main processor 710 in the first sound mode. The look-up table 741 stores information about a fundamental tone and harmonic tones of a second sound according to the frequency of each of the fundamental tone and harmonic tones of the first sound. The look-up table 741 may output the information about the fundamental tone and harmonic tones of the second sound using the frequency of each of the fundamental tone and harmonic tones of the first sound as an input address. The main processor 710 may generate second sound data in the first sound mode using the information about the fundamental tone and harmonic tones of the second sound input from the look-up table 741, and may output the second sound data to the second sound driver 760.

According to the embodiment shown in FIG. 23, due to the look-up table 741, an amplification effect that the sound pressure level of the fundamental tone of the third sound, which is a sum of the first sound and the second sound, becomes higher than (or greater than) the sound pressure level of the fundamental tone of the first sound can be obtained, and concurrently (e.g., simultaneously) an offset effect that the sound pressure level of any one of the harmonic tones of the third sound becomes lower than (or less than) the sound pressure level of any one of the harmonic tones of the first sound can be obtained. Therefore, it is possible to prevent or reduce the deterioration of sound quality provided to the user due to the harmonic tones of the first sound and to provide a high-quality sound by increasing the sound pressure level of the fundamental tone of the first sound.

Further, according to the embodiment shown in FIG. 23, when the look-up table 741 is used, the fundamental tone and harmonic tones of the second sound can be determined, and circuit complexity can be lowered, compared to when the phase shifter 750 is used.

Figure 24:
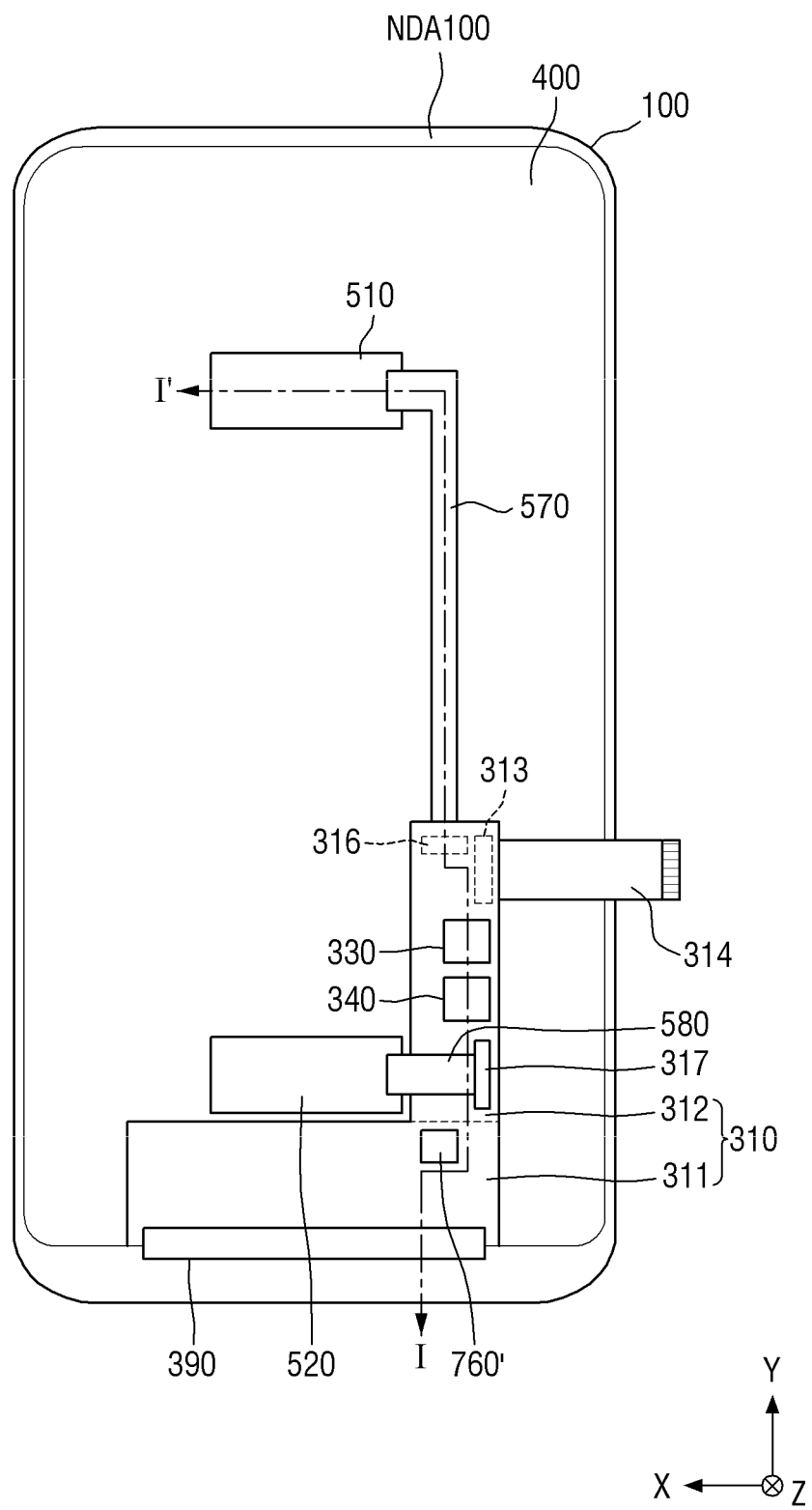
FIG. 24 is a bottom view showing a display panel attached to the cover window of FIG. 2 according to an exemplary embodiment.
Figure 25:
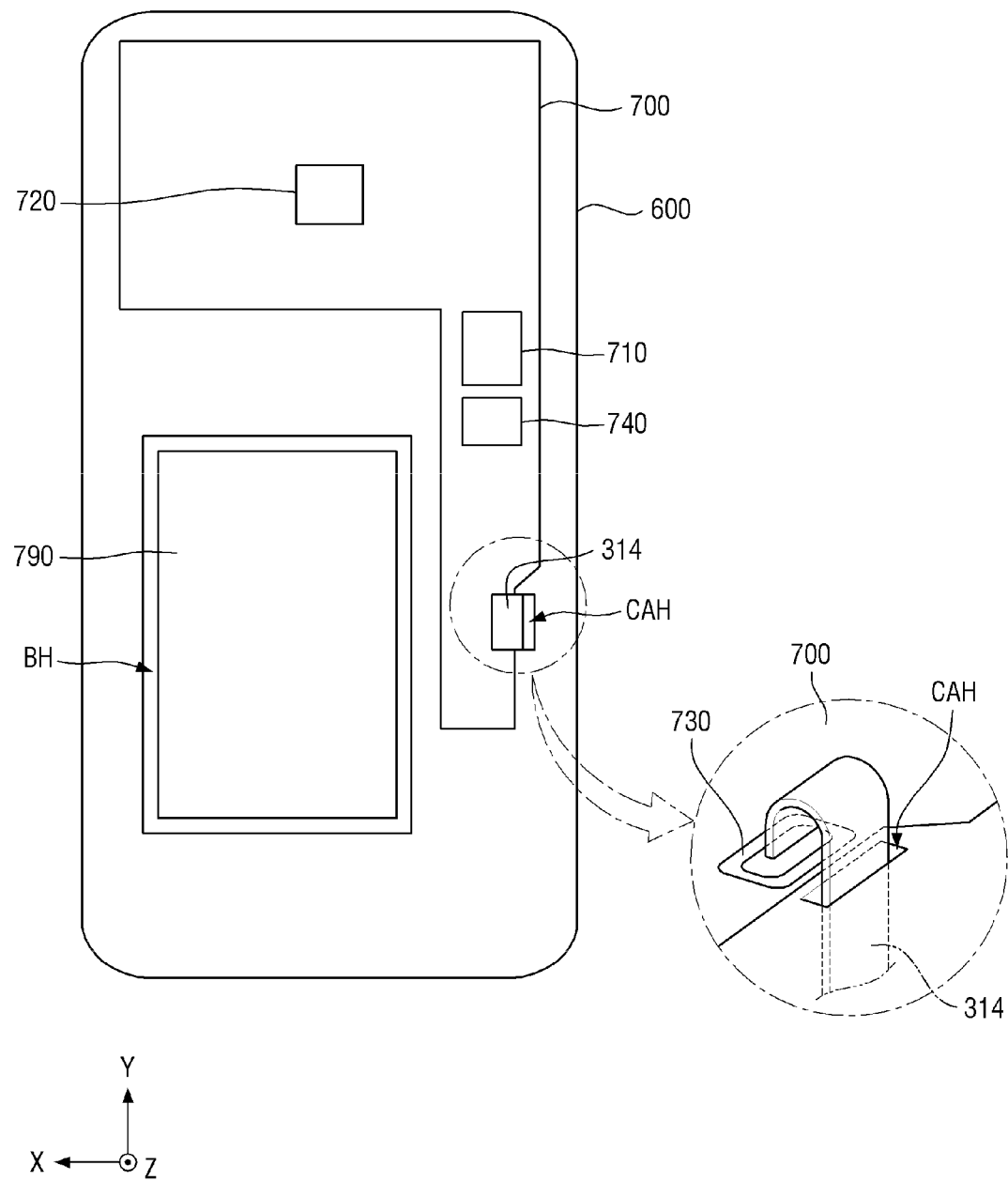
FIG. 25 is a bottom view showing a bracket attached to the lower surface of the display panel of FIG. 3 and a main circuit board disposed on the bracket according to an exemplary embodiment.

FIG. 24 is a bottom view showing a display panel attached to the cover window of FIG. 2 according to an exemplary embodiment, and FIG. 25 is a bottom view showing a bracket attached to the lower surface of the display panel of FIG. 3 and a main circuit board disposed on the bracket according to an exemplary embodiment.

The embodiments shown in FIGS. 24 and 25 are different from the embodiments shown in FIGS. 3 and 4 in that the second sound generator 520 is disposed on one surface of the display panel 300 instead of being removed from the bracket 600. In FIGS. 24 and 25, a description substantially the same as the embodiment shown in FIGS. 3 and 4 may be omitted (e.g., may not be repeated).

Referring to FIGS. 24 and 25, the second sound generator 520 may be attached onto one surface of the display panel 300 using a second adhesive member such as a pressure sensitive adhesive. As shown in FIG. 24, when the panel lower member 400 is disposed on one surface of the display panel 300, the second sound generator 520 may be attached onto the panel lower member 400 through the second adhesive member.

The second sound generator 520 may be a piezoelectric element or a piezoelectric actuator that vibrates the display panel 300 using a piezoelectric material contracting and expanding according to an applied voltage. Although it is illustrated in FIG. 24 that the second sound generator 520 has a rectangular parallelepiped shape, the shape of the second sound generator 520 is not limited thereto. The first sound generator 510 may be disposed adjacent to the upper side of the display panel 300, and the second sound generator 520 may be disposed adjacent to the lower side of the display panel 300.

A third connector 317 and a second sound driver 760' may be disposed on one surface of the display circuit board 310. The third connector 317 may include an insertion portion connected to a connection terminal provided at one end of a second flexible circuit board 580 (e.g., a second flexible printed circuit board).

The connection terminal provided at one end of the second flexible circuit board 580 may be inserted into the insertion portion of the third connector 317. The other end of the second flexible circuit board 580 may be connected to the second sound generator 520. The second flexible circuit board 580 may be a flexible printed circuit board or a flexible printed circuit (FPC).

When both the first sound generator 510 and the second sound generator 520 are piezoelectric elements or piezoelectric actuators, it is suitable to output a sound of a high frequency band. When the second sound generator 520 is a linear resonant actuator LRA, the first sound generator 510 outputs a first sound of a high-frequency band in the second sound mode, and the second sound generator 520 outputs a second sound of a low-frequency band in the second sound mode. In contrast, when the second sound generator 520 is a piezoelectric element or a piezoelectric actuator, the first sound generator 510 may output a first stereo sound in the second sound mode, and the second sound generator 520 may output a second stereo sound in the second sound mode. That is, the display device 10 may provide stereo sounds in the second sound mode.

Although certain exemplary embodiments and implementations have been described herein, other embodiments and modifications will be apparent from this description. Accordingly, the inventive concepts are not limited to such embodiments, but rather, encompass the broader scope of the appended claims and various obvious modifications and equivalent arrangements as would be apparent to a person of ordinary skill in the art.

What is claimed is:

1. A display device, comprising:
a display panel;
a first sound generator on a first surface of the display panel, the first sound generator being configured to vibrate the display panel to output a first sound; and
a second sound generator for outputting a second sound by vibration,
wherein a third sound is a sum of the first sound and the second sound, and a sound pressure level of at least one of harmonic tones of the third sound is less than a sound pressure level of at least one of harmonic tones of the first sound,
wherein a sound pressure level of a fundamental tone of the third sound is greater than a sound pressure level of a fundamental tone of the first sound, and
wherein the sound pressure level of a first harmonic tone of the harmonic tones of the third sound is less than the sound pressure level of a first harmonic tone of the harmonic tones of the first sound.

2. The display device of claim 1,
wherein a difference between a phase of at least one of the harmonic tones of the first sound and a phase of at least one of harmonic tones of the second sound is less than −90° and more than 90°.

3. The display device of claim 2,
wherein the sound pressure level of at least one harmonic tone of the first sound is different from the sound pressure level of at least one harmonic tone of the second sound.

4. The display device of claim 1,
wherein a difference between a phase of the fundamental tone of the first sound and a phase of the fundamental tone of the second sound is in a range from −90° to 90°.

5. The display device of claim 4,
wherein the sound pressure level of the fundamental tone of the first sound is different from the sound pressure level of the fundamental tone of the second sound.

6. The display device of claim 1,
wherein the sound pressure level of a second harmonic tone of the third sound is less than the sound pressure level of a second harmonic tone of the first sound.

7. The display device of claim 6,
wherein a difference between a phase of the first harmonic tone of the first sound and a phase of the first harmonic tone of the second sound is less than −90° and more than 90°, and
a difference between a phase of the second harmonic tone of the first sound and a phase of the second harmonic tone of the second sound is less than −90° and more than 90°.

8. The display device of claim 7,
wherein the sound pressure level of the first harmonic tone of the first sound is different from the sound pressure level of the first harmonic tone of the second sound, and the sound pressure level of the second harmonic tone of the first sound is different from the sound pressure level of the second harmonic tone of the second sound.

9. A display device, comprising:
a display panel;
a first sound generator on a first surface of the display panel, the first sound generator being configured to vibrate the display panel to output a first sound; and
a second sound generator for outputting a second sound by vibration,
wherein a third sound is a sum of the first sound and the second sound, and a sound pressure level of at least one of harmonic tones of the third sound is less than a sound pressure level of at least one of harmonic tones of the first sound,
wherein the sound pressure level of a first harmonic tone of the harmonic tones of the third sound is greater than the sound pressure level of a first harmonic tone of the harmonic tones of the first sound, and
wherein the sound pressure level of a second harmonic tone of the harmonic tones of the third sound is less than the sound pressure level of a second harmonic tone of the harmonic tones of the first sound.

10. The display device of claim 9,
wherein a difference between a phase of the first harmonic tone of the first sound and a phase of the first harmonic tone of the second sound is in a range from −90° to 90°.

11. The display device of claim 9,
wherein a difference between a phase of the second harmonic tone of the first sound and a phase of the second harmonic tone of the second sound is less than −90° and more than 90°.

12. The display device of claim 1,
wherein each of the first sound generator and the second sound generator is a piezoelectric element or a piezoelectric actuator comprising a piezoelectric material configured to contract and to expand according to an applied voltage.

13. The display device of claim 12,
wherein the second sound generator is on the first surface of the display panel, and is configured to vibrate the display panel to output the second sound.

14. The display device of claim 1, further comprising:
a bracket on the first surface of the display panel,
wherein the second sound generator is on a second surface of the bracket that is opposite to a first surface of the bracket facing the display panel.

15. The display device of claim 14,
wherein the first sound generator is a piezoelectric element or a piezoelectric actuator comprising a piezoelectric material configured to contract and expand according to an applied voltage, and
the second sound generator is a linear resonant actuator configured to vibrate the bracket by generating a magnetic force utilizing a voice coil according to an applied voltage.

16. The display device of claim 1, further comprising:
a first sound driver configured to convert first sound data into first sound signals and to output the first sound signals to the first sound generator;
a second sound driver configured to convert second sound data into second sound signals and to output the second sound signals to the second sound generator; and
a phase shifter configured to modulate second sound data and to output the second sound data to the second sound driver to shift a phase of a fundamental tone of the second sound and a phase of at least one harmonic tone of the second sound.

17. The display device of claim 16, further comprising:
a main processor configured to output the first sound data to the first sound driver and to output the second sound data to the phase shifter; and
a main circuit board with the main processor, the second sound driver, and the phase shifter.

18. The display device of claim 16, further comprising:
a display circuit board on the first surface of the display panel, the first sound driver being located on the display circuit board.

19. The display device of claim 18,
wherein the phase shifter and the first sound driver are formed as one integrated circuit.

20. The display device of claim 1, further comprising:
a first sound driver configured to convert first sound data into first sound signals and to output the first sound signals to the first sound generator;
a second sound driver configured to convert second sound data into second sound signals and to output the second sound signals to the second sound generator; and
a look-up table configured to store information about a fundamental tone and at least one harmonic tone of the second sound according to frequencies of a fundamental tone and at least one harmonic tone of the first sound.

21. The display device of claim 20, further comprising:
a main processor configured to output the first sound data to the first sound driver and to output the second sound data to a phase shifter; and
a main circuit board with the main processor, the second sound driver, and the look-up table.

22. A sound providing method of a display device, comprising:
shifting a phase of a fundamental tone of a first sound in a first sound mode to generate a fundamental tone of a second sound;
shifting a phase of at least one harmonic tone of the first sound in the first sound mode to generate at least one harmonic tone of the second sound;
outputting first sound data comprising information about the fundamental tone of the first sound and the at least one harmonic tone of the first sound in the first sound mode, and outputting second sound data comprising information about the fundamental tone of the second sound and the at least one harmonic tone of the second sound in the first sound mode;
generating first sound signals according to the first sound data and outputting the first sound signals to a first sound generator; and
generating second sound signals according to the second sound data and outputting the second sound signals to a second sound generator,
wherein a third sound is a sum of the first sound and the second sound, and a sound pressure level of at least one of harmonic tones of the third sound is less than a sound pressure level of at least one of harmonic tones of the first sound, and
wherein the sound pressure level of a first harmonic tone of the harmonic tones of the third sound is less than the sound pressure level of a first harmonic tone of the harmonic tones of the first sound.

23. The method of claim 22, further comprising:
shifting a phase of any one harmonic tone of the second sound, having the same frequency as the fundamental tone of the first sound, in a second sound mode; and
outputting second sound data comprising information about the fundamental tone of the second sound and the any one phase-shifted harmonic tone of the second sound in the second sound mode.

24. The method of claim 22, further comprising:
shifting a phase of any one harmonic tone of the second sound, having the same frequency as the fundamental tone of the first sound, in a second sound mode;
shifting a phase of another harmonic tone of the second sound, having the same frequency as the any one harmonic tone of the first sound, in the second sound mode; and
outputting second sound data comprising information about the fundamental tone of the second sound, the any one phase-shifted harmonic tone of the second sound, and the another harmonic tone of the second sound in the second mode.

* * * * *